United States Patent
Kim et al.

(10) Patent No.: US 10,021,517 B2
(45) Date of Patent: Jul. 10, 2018

(54) CONTROL BASED ON GEO-DEPENDENT CONDITIONS

(71) Applicant: Belkin International Inc., Playa Vista, CA (US)

(72) Inventors: Ryan Yong Kim, Rolling Hills Estates, CA (US); Venkata Subba Rao Pathuri, Alpharetta, GA (US); Francis Michael Kelly, Thousand Oaks, CA (US); Ohad Zeira, Santa Monica, CA (US); Brian Van Harlingen, Torrance, CA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 0 days.

(21) Appl. No.: 14/798,734

(22) Filed: Jul. 14, 2015

(65) Prior Publication Data
US 2016/0021502 A1    Jan. 21, 2016

Related U.S. Application Data

(60) Provisional application No. 62/024,702, filed on Jul. 15, 2014.

(51) Int. Cl.
| | |
|---|---|
| *H04W 4/021* | (2018.01) |
| *H04W 56/00* | (2009.01) |
| *H04W 64/00* | (2009.01) |
| *H04W 4/02* | (2018.01) |
| *H04W 4/50* | (2018.01) |

(52) U.S. Cl.
CPC ............ *H04W 4/021* (2013.01); *H04W 4/02* (2013.01); *H04W 56/00* (2013.01); *H04W 64/003* (2013.01); *H04W 4/50* (2018.02)

(58) Field of Classification Search
None
See application file for complete search history.

(56) References Cited

U.S. PATENT DOCUMENTS

| | | | |
|---|---|---|---|
| 2006/0068812 A1 | 3/2006 | Carro et al. | |
| 2008/0013540 A1* | 1/2008 | Gast | H04L 29/06027 370/392 |

(Continued)

FOREIGN PATENT DOCUMENTS

| | | |
|---|---|---|
| WO | 2014/016705 A2 | 1/2014 |

OTHER PUBLICATIONS

International Search Report and Written Opinion of the International Searching Authority for PCT Application No. PCT/US2015/040330, dated Oct. 6, 2015, 11 pages.

*Primary Examiner* — Leon-Viet Nguyen
(74) *Attorney, Agent, or Firm* — Kilpatrick Townsend & Stockton LLP

(57) ABSTRACT

A network device capable of performing rule-based actions dependent on geolocation-based conditions or realtime conditions from an external source. The network device can obtain its geolocation, obtain a rule based on a condition, query sources for and/or calculate updated statuses of the condition based on the geolocation, and perform actions based on the updated status of the condition, the geolocation, and the rule. The network device is capable of safely shutting down when voltage supplied to the network device falls outside of and acceptable range.

36 Claims, 16 Drawing Sheets

(56) References Cited

U.S. PATENT DOCUMENTS

| | | | |
|---|---|---|---|
| 2008/0112269 A1* | 5/2008 | Lawton | G04R 20/00 368/10 |
| 2009/0129067 A1 | 5/2009 | Fan et al. | |
| 2014/0171116 A1* | 6/2014 | LaMarca | H04W 4/02 455/456.3 |
| 2014/0210822 A1* | 7/2014 | Raley | G06T 15/80 345/426 |
| 2014/0232292 A1* | 8/2014 | Adler | H05B 37/02 315/294 |

* cited by examiner

CONTROL BASED ON GEO-DEPENDENT CONDITIONS

CROSS REFERENCE TO RELATED APPLICATIONS

The present application claims the benefit of U.S. Provisional Patent Application No. 62/024,702, filed on Jul. 15, 2014 and entitled "CONTROL BASED ON GEO-DEPENDENT CONDITIONS," which is hereby incorporated by reference in its entirety.

TECHNICAL FIELD

The present disclosure relates to network addressable devices generally and more specifically to network addressable interface devices.

SUMMARY

A network device capable of performing rule-based actions dependent on geolocation-based conditions. The network device can obtain its geolocation, obtain a rule based on a condition, query sources for and/or calculate updated statuses of the condition based on the geolocation, and perform actions based on the updated status of the condition, the geolocation, and the rule.

A network device is further capable of safely shutting down when voltage supplied to the network device falls outside of an acceptable range.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
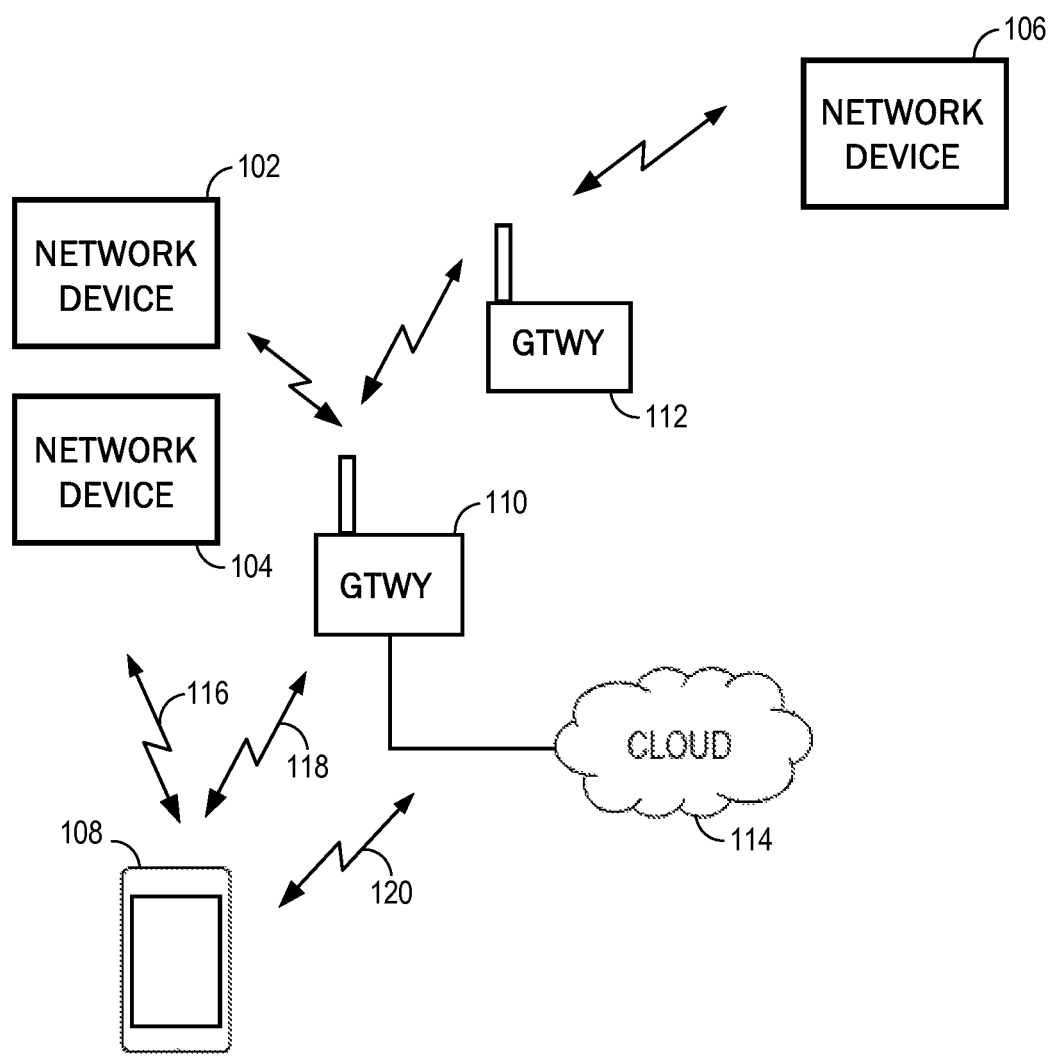
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network. As explained herein, techniques are provided that enable rule-based actions dependent upon the status of certain conditions, such as internet-accessible conditions or geolocation-specific conditions. These techniques allow a network device to perform various actions based on data derived from external sources or based on specific locations.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

Accordingly, techniques and systems are described herein for performing rule-based actions based on geolocation-dependent conditions. Also described are techniques and systems for performing rule-based actions based on externally-obtainable conditions, such as conditions determined from internet queries or queries to an external server.

In certain embodiments, a network device can perform an action dependent upon the functionality of the network device. Examples of actions include completing a circuit, turning on or off a device (e.g., a light, a space heater, any other device), sensing a variable (e.g., temperature or pressure), opening a door, generating a sound, transmitting a signal, or any other suitable action. A user can interact with the network device, specifically with regards to the network device's actions, using an access device. In some embodiments, a user can interact with the network device directly. Interactions with the network device, whether directly or remotely, can include directing the network device to perform an action (e.g., turn on a light), receiving information related to an action (e.g., receive a current temperature or the on/off status of a switch), programming a network device to operate based on a defined rule (e.g., turn light on at 6:00 PM), or any other suitable interaction.

In some embodiments, the network device can be programmed to perform a certain action based on a condition (e.g., turn light on at sunset, turn on heater when outside temperature drops below 19° C., or make a sound when a sports team scores). A condition can be any variable capable of having a first status and an updated status. Examples of conditions include, but are not limited to, solar times (e.g., sunrise times, where the first status is a first sunrise time and an updated status is a second sunrise time); stock prices (e.g., a first status may be a price at one point in time and an updated status may be a price at a subsequent point in time); temperatures; pressures; traffic patterns; road conditions; or any other suitable variable.

In some cases, the conditions can be location dependent (e.g., sunrise and sunset times). In some cases, the conditions can be predictable (e.g., sunrise and sunset times at a particular location, or travel times to work given expected traffic) or non-predictable (e.g., when a sports team scores or when a colleague tweets your name).

In some embodiments, times, including time-dependent events and internal clock times, can be adjusted for daylight savings time and time zone changes. Daylight savings time changes and time zone changes can be location-dependent and can be updated automatically based on a sensed location.

In some embodiments, a network device can obtain status information about a condition from an external source (e.g., external to the network device itself), such as from another network device, an access device, a server on the cloud, a server on the internet, or another suitable source. By way of example, a network device can obtain sports score updates and updated tweets from the internet (e.g., by data being pushed to the device or by performing a query on the internet). In some embodiments, the network device can additionally obtain geolocation information, such as geolocation information about the network device itself or about a desired location (e.g., a highway between a user's home and office). The network device can use the geolocation information to obtain the status of location-specific variables from an external source.

Geolocation information can be set by a user in software, such as by a user providing a street address, a city name, a zip code, longitude/latitude coordinates, or other manual inputs. Geolocation information can be detected using GPS, IP addresses, wife surveys, or any other suitable methods. In some embodiments, a network device can obtain, and use as its own, the geolocation of another network device, such as a device on a local network.

In some embodiments, the network device has an internal realtime clock. In other embodiments, the network device has an internal relative clock that is synchronized with an external clock, such as a clock of another network device, a clock of the access device, a clock of a GPS satellite, a clock of a server (e.g., a server in the cloud), a network time protocol (NTP) service, or a clock of another suitable source.

In some embodiments, predictable conditions, such as sunrise/sunset times, can be determined based on a stored algorithm. In an example, a network device can use a stored equation to calculated the estimated sunrise/sunset times based on the current day and the current location. In some embodiments, predictable conditions can be predicted based on external data. For example, the travel time to from home to work can be predicted based one or more of traffic conditions, road conditions, weather conditions, and other conditions.

In some embodiments, a network device can retrieve a large number of status updates for a condition and store it in memory. For example, a network device can retrieve a year's worth of sunrise/sunset times and store them in memory. Instead of calculating the next sunrise/sunset time and/or retrieving the next sunrise/sunset time from an external source, the network device can retrieve the next sunrise/sunset time from its own memory.

In an embodiment, the rule can include an offset to provide for performance of the action at an earlier or later time. For example, a rule based on turning on lights at sunset can include a user-set offset so that the lights turn on before the official sunset time. For example, a user can have a rule that turns lights on 30 minutes before sunset, such as if the user's house tends to get dark before the actual sunset time. The offset can be set by a user (e.g., typed in or selected from a list).

In some embodiments, the offset can be obtained from a database of collected or calculated offsets. For example, a specific neighborhood may get dark (e.g., apparent sunset) 20 minutes before actual sunset time. Therefore, in order to have an action take place at an apparent sunset time (e.g., when the home gets dark), a 20 minute offset can be subtracted from the actual sunset time in order to calculate the apparent sunset time. A network device can determine, based on geolocation, that the network device is in that particular neighborhood, then the network device can access a database containing offset times for that neighborhood and know to offset the sunset time by the appropriate amount (e.g., 20 minutes) in order to have the lights turn on at the apparent sunset time. Other offset times can be used. In some embodiments, the offset times located in the database can be based on offset times used by other devices sharing a similar or nearby geolocation. In some embodiments, the offset times can be based on offset times previously used to program another network device on the same logical network.

In some embodiments, the offset can be calculated based on geolocation information and topographical information. Optionally, the offset can be calculated based also on altitude (e.g., relative altitude from a barometric sensor+known altitude of ground level for a particular geolocation). Calculations can be performed by the network device, an external server, or another device. The calculated offset can be based on a comparison of the geolocation (e.g., of the network device), topographical maps of the area near the geolocation, and the approximate path of the sun in the sky as related to the topographical features near the geolocation. The topographical maps may or may not include manmade structures, such as buildings and bridges. Comparison of geolocation, topography, and sun path can lead to an approximate calculation of when the geolocation will be in darkness, due either to actual sunset or to the sun setting behind a building, ridge, or other topographical features. If the geolocation is determined to be in darkness before actual sunset time, the difference in time can be used as an offset. In an embodiment, a user attempting to program a rule to turn on a network device at sunset can be presented with a recommended offset based on the user's geolocation, nearby topography, and the sun's path as it sets. The user can accept, alter, or reject the offset. In another embodiment, the user can select for the network device to turn on at "apparent sunset," rather than "actual sunset," in which case the calculated offset can be used without further input from the user.

In an embodiment, the rule can include a randomized offset to provide an element of randomization to the performance of the action. For example, a rule based on turning on and off lights at sunset and sunrise, respectively, can include a randomized offset so that the lights turn on and off at varying times each day, giving the location a sense of being inhabited (e.g., as if the lights were being turned on and off by a human). The randomized offset can be based on a random or pseudo-random number generator.

In some embodiments, rules can further depend on other variables, such as whether one or more network devices (e.g., access devices) are within a certain geolocation perimeter (e.g., if a user's phone is detected within the house). Rules can further depend on additional conditions.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
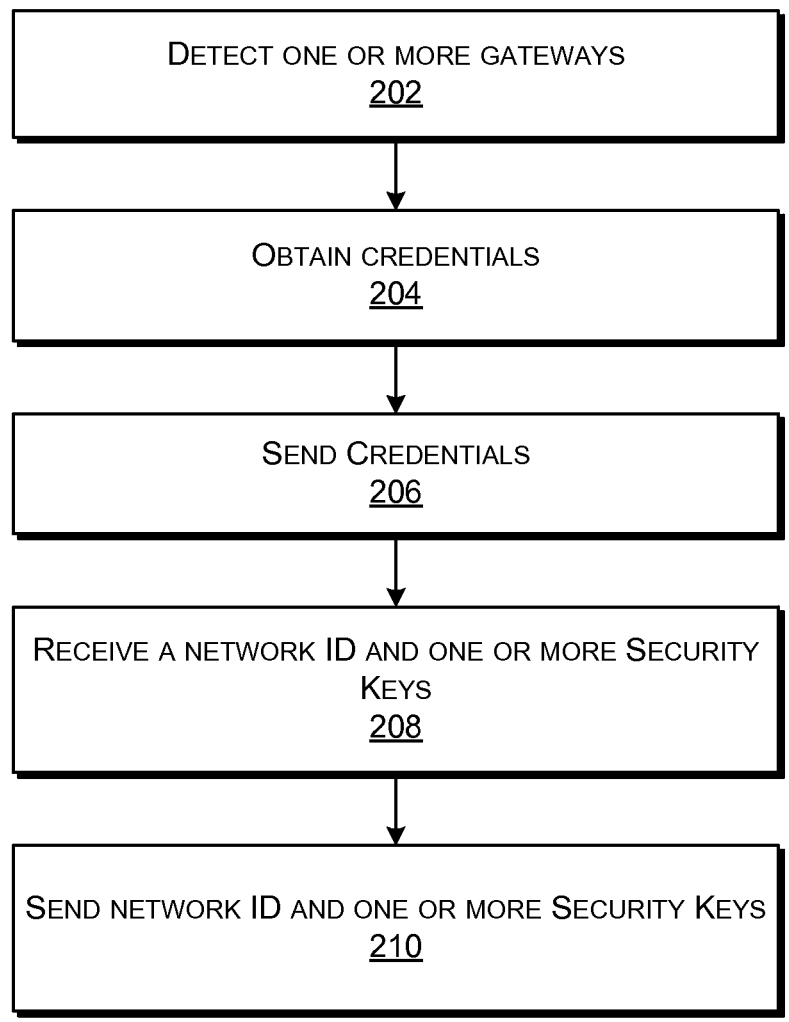
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the—network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the—network devices 102 and/or 104 may be registered with the cloud network 114 and associated with a logical network within the local area network 100. Similarly, upon being powered or switched off or otherwise being disconnected from the network 100, the status of the—network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the—network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the network devices on the network 100. In other embodiments, one-network device may check the status of one or more of the other network devices on the network 100. The network device may seek to check the status of another network device or access device for various reasons, including to display such status (es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
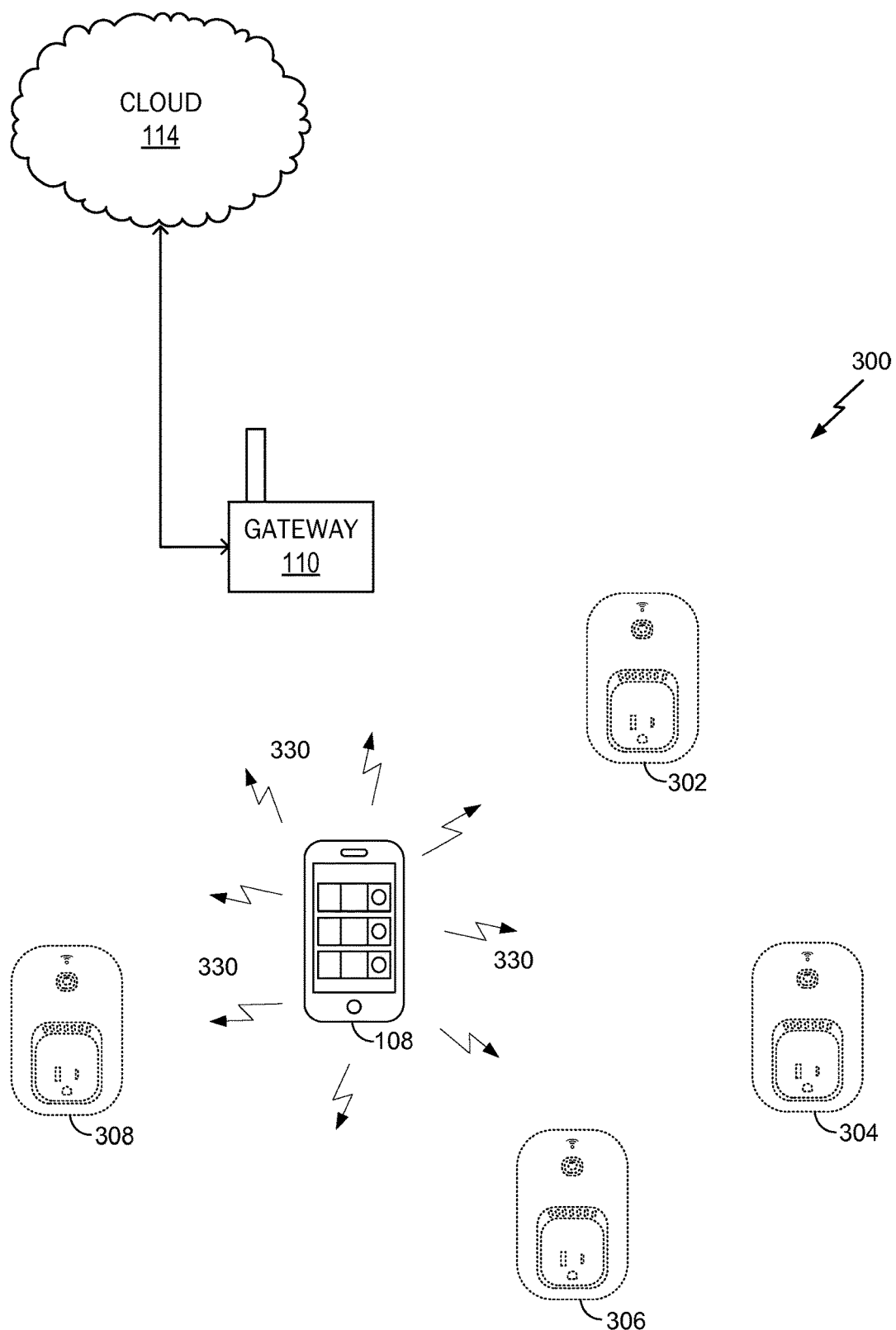
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
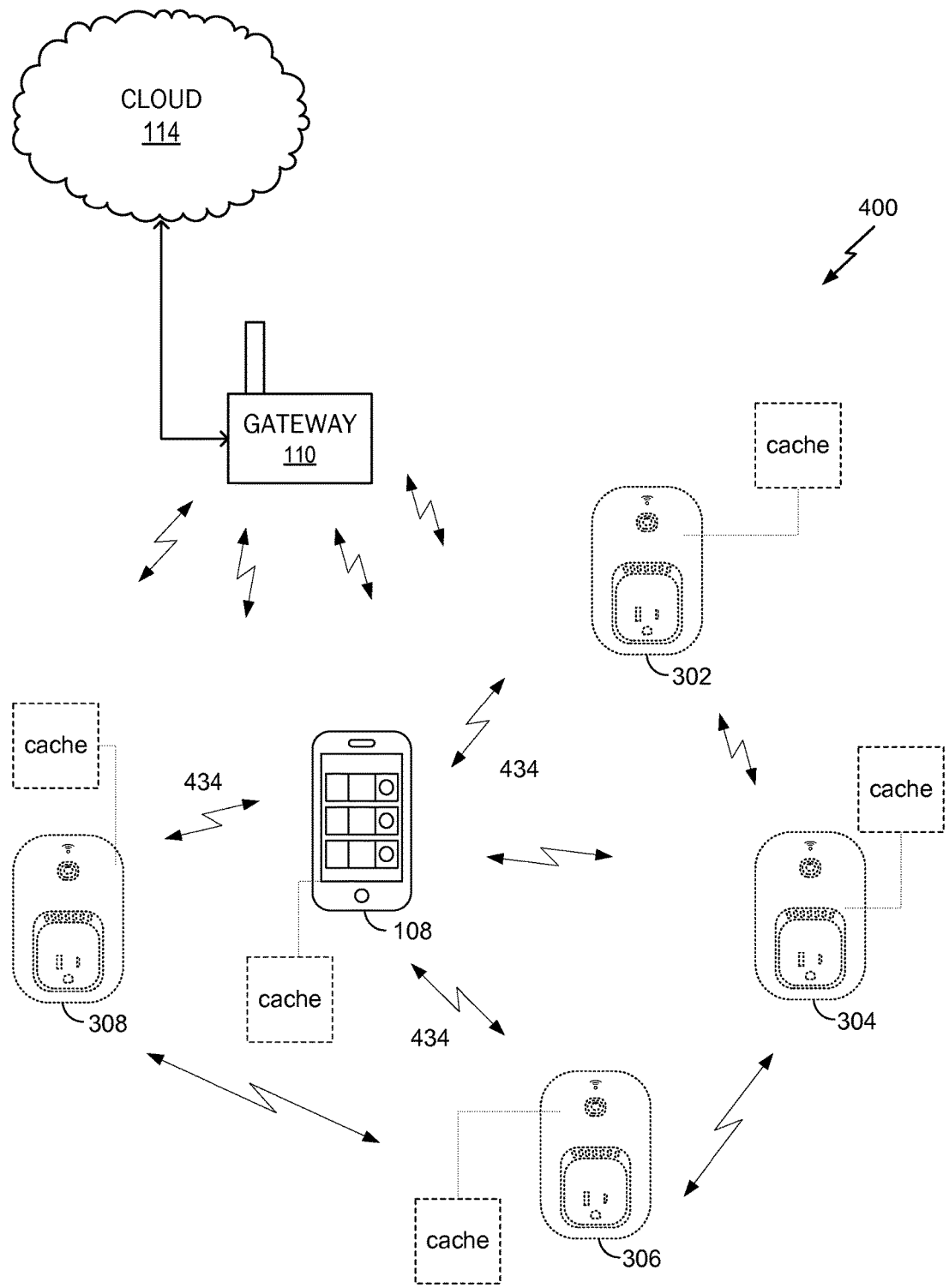
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
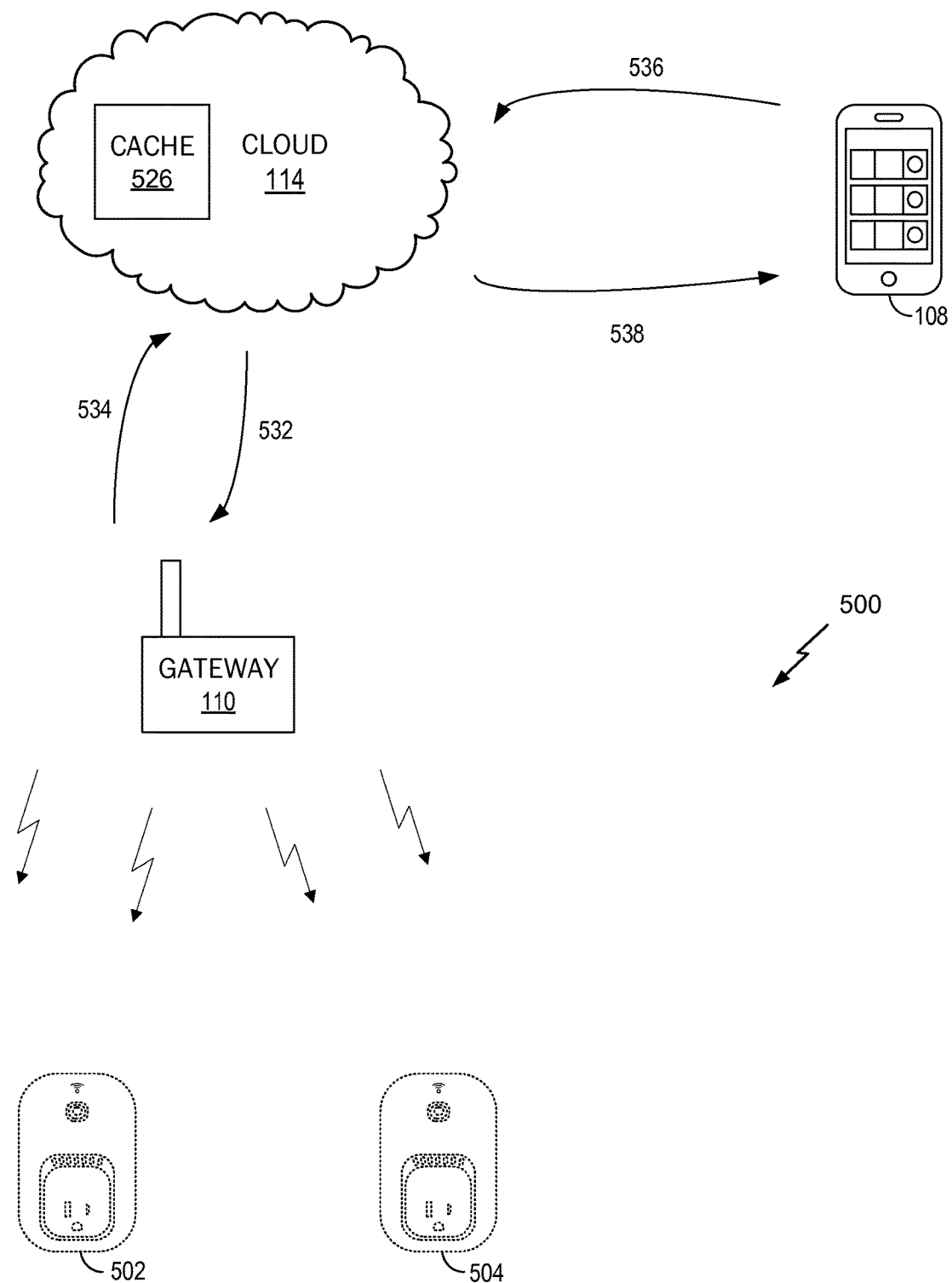
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
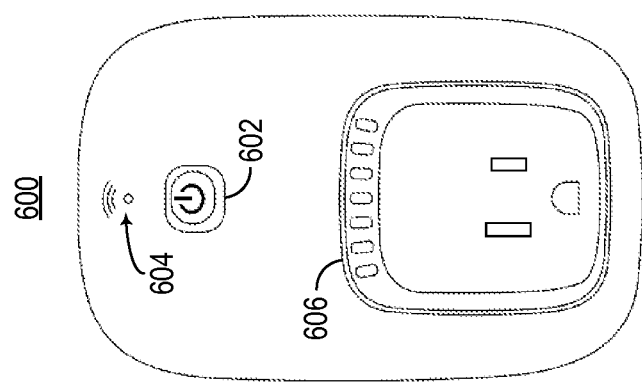
FIG. 6 is an illustration of an example of a front view of a network device, in accordance with an embodiment.
Figure 7:
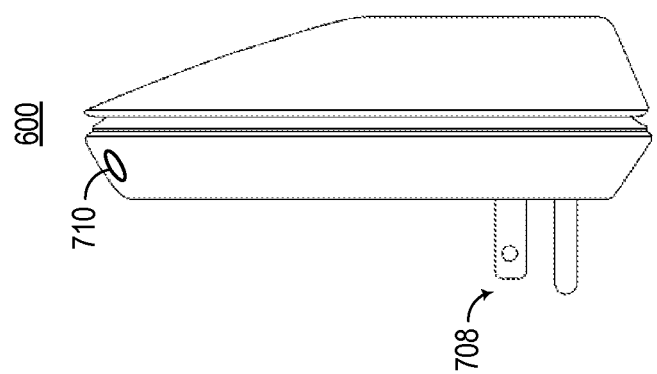
FIG. 7 is an illustration of an example of a side view of a network device, in accordance with an embodiment.

FIG. 6 illustrates an example of a front view of a network device 600. FIG. 7 illustrates an example of a side view of the network device 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes an power switch 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 and an outlet 606. The plug 708 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the socket 606 may be controlled by a user using an access device (e.g., access device 108).

Figure 8:
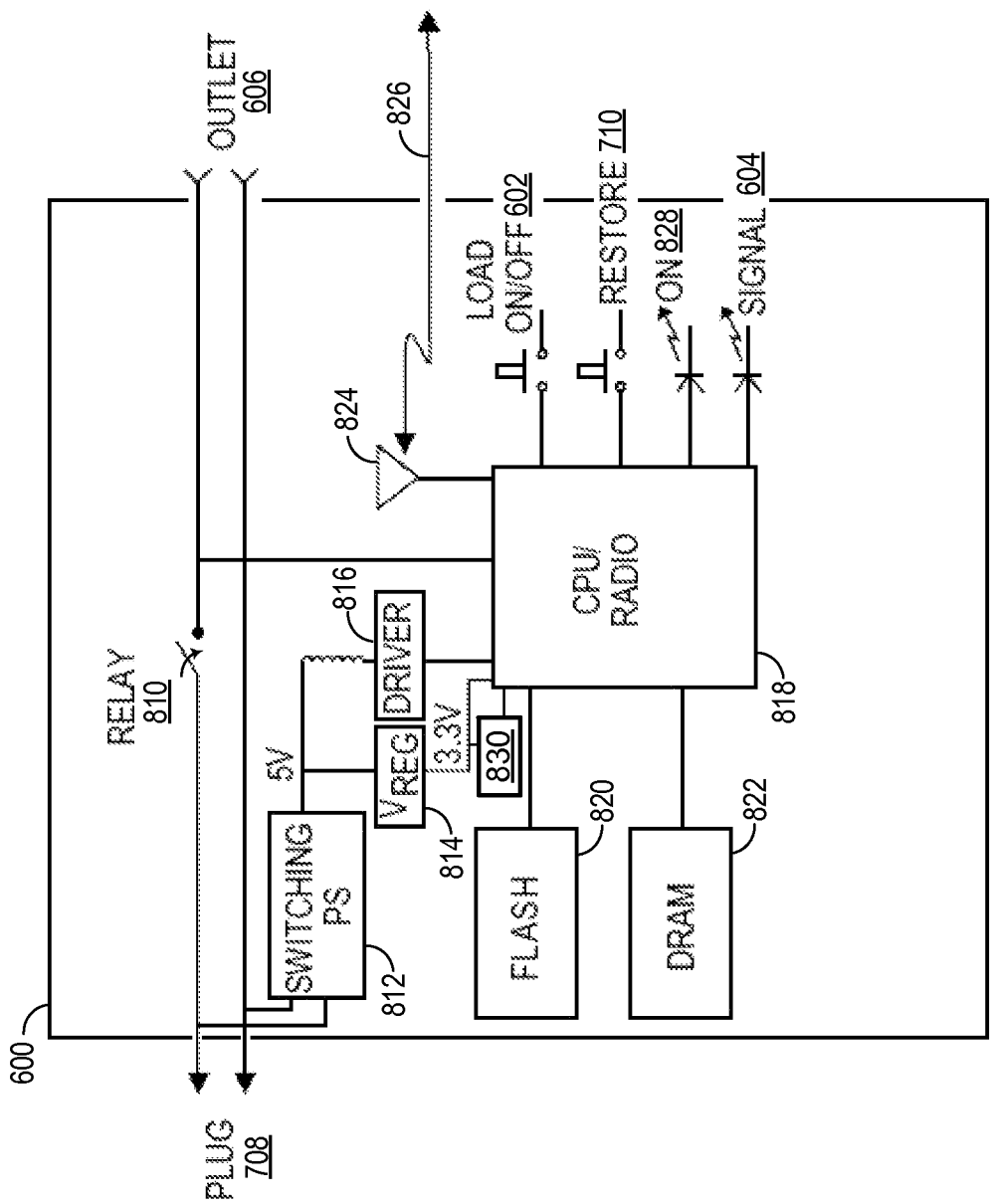
FIG. 8 is an example of a block diagram of a network device, in accordance with an embodiment.

FIG. 8 is an example of a block diagram of the network device 600 depicting different hardware and/or software components of the network device 600. As described above with respect to FIGS. 6 and 7, the network device 600 includes the outlet 606, the plug 708, the power button 602, the restore button 710, and the communications signal indicator 604. The network device 600 also includes light source 828 associated with the power button 602. As previously described, the light source 828 may be illuminated when the network device 600 is powered on.

The network device 600 further includes a relay 810. The relay 810 is a switch that controls whether power is relayed from the plug 708 to the outlet 606. The relay 810 may be controlled either manually using the power button 602 or remotely using wireless communication signals. For example, when the power button 602 is in an ON position, the relay 810 may be closed so that power is relayed from the plug 708 to the outlet 606. When the power button 602 is in an OFF position, the relay 810 may be opened so that current is unable to flow from the plug 708 to the outlet 606. As another example, an application or program running on an access device may transmit a signal that causes the relay 810 to be opened or closed. For instance, an access application may display a graphical interface on the access device that includes a power button. The user may tap or otherwise select the power button, and the access application may send a communication signal (e.g., over a WiFi network) to the network device 600 instructing the network device 600 to open or close the relay 810.

The network device 600 further includes flash memory 820 and dynamic random access memory (DRAM) 822. The flash memory 820 may be used to store instructions or code relating to an operating system, one or more applications, and any firmware. The flash memory 820 may include nonvolatile memory so that any firmware or other program can be can updated. In the event the network device 600 loses power, information stored in the flash memory 820 may be retained. The DRAM 822 may store various other types of information needed to run the network device 600, such as all runtime instructions or code.

The network device 600 further includes a CPU/Radio 818. The CPU/Radio 818 controls the operations of the network device 600. For example, the CPU/Radio 818 may execute various applications or programs stored in the flash memory 820 and/or the dynamic random access memory (DRAM) 822. The CPU/Radio 818 may also receive input from the various hardware and software components, interpret the input, and perform one or more functions in response to the input. As one example, the CPU/Radio 818 may determine whether the power button 602 has been pressed, and determines whether the relay 810 needs to be opened or closed. The CPU/Radio 818 may further perform all communications functions in order to allow the network device 600 to communicate with other network devices, one or more gateways, a cloud network, and/or one or more access devices. While the CPU and radio of the network device 600 are shown to be combined in the CPU/Radio 818, one of ordinary skill in the art will appreciate that, in some embodiments, the CPU and radio may be separately located within the network device 600. For example, CPU circuitry may be situated at a separate location on a circuit board from the location of radio circuitry, the CPU circuitry may be located on a different circuit board from the radio circuitry, or the like. Further, the network device 600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 600 does not include a cellular network transceiver radio or interface, and thus may not be configured to directly communicate with a cellular network. In some embodiments, the network device 600 may include a cellular network transceiver radio, and may be configured to communicate with a cellular network using the cellular network transceiver radio.

The network device 600 may communicate with other devices and/or networks via antenna 824. For example, antenna 824 may include a 2.4 GHz antenna, a 5 GHz antenna, or the like, that can transmit and receive WiFi communications signals. The network device 600 may include other types of antennas that can communicate Bluetooth® signals, Zigbee® signals, Ultra-Wideband (UWB) signals, WiFi-Direct signals, BLE signals, and/or the like. In some embodiments, the antenna 824 may be configured to communicate different types of signals, such as the WiFi signals, Bluetooth® signals, Zigbee® signals, UWB signals, WiFi-Direct signals, BLE signals, and/or the like. In some embodiments, the network device 600 may include multiple antennas for communicating the different types of communication signals. As one example, the network device 600 may include both a 2.4 GHz antenna and a 5 GHz antenna.

The network device 600 further includes a driver 816, a switching power supply 812, and a voltage regulator 814. The driver 816 may include instructions or code that can be used to translate control signals or commands received from applications running on the DRAM 822 to commands that the various hardware components in the network device 600 can understand. In some embodiments, the driver 816 may include an ambient application running on the DRAM 822. The switching power supply 812 may be used to transfer power from the outlet in which the plug 708 is connected to the various loads of the network device 600 (e.g., CPU/Radio 818). The switching power supply 812 may efficiently convert the voltage and current characteristics of the electrical power to a level that is appropriate for the components of the network device 600. For example, the switching power supply 812 may perform AC-DC conversion. In some embodiments, the switching power supply 812 may be used to control the power that is relayed from the plug 708 to the outlet 606. The voltage regulator 814 may be used to convert the voltage output from the switching power supply 812 to a lower voltage usable by the CPU/Radio 818. For example, the voltage regulator 814 may regulate the DC voltage from 5V to 3.3V.

In some embodiments, the network device 600 further includes a supervisory circuit 830. The supervisory circuit 830 can monitor voltage output from the voltage regulator 814. When the supervisory circuit 830 senses a voltage below a safe threshold, for example a voltage at or below 2.95 Vdc, the supervisory circuit 830 can hold the CPU/Radio 818 in reset, for example by setting a reset line to low. However, when the supervisory circuit 830 senses a sufficient voltage, for example a voltage above 2.95 Vdc, the supervisory circuit 830 can provide a high on the reset line, allowing the CPU/Radio 818 to operate as normal. The supervisory circuit 830 can therefore protect the network device 600 from behaving erratically due to problems in the supply voltage. In some embodiments, the supervisory circuit 830 can be implemented within the CPU/Radio 818. In some embodiments, the supervisory circuit 830 can begin an orderly shutdown and/or startup when the voltage it senses approaches or crosses a threshold voltage. In some embodiments, the supervisory circuit 830 can have a lower threshold voltage and an upper threshold voltage, wherein the CPU/Radio 818 is allowed to operate, by the supervisory circuit 830, when the supplied voltage is in the rage between the lower threshold voltage and upper threshold voltage.

In various embodiments, functions may be stored as one or more computer-program products, such as instructions or code, in a non-transitory machine-readable storage medium, such as the flash memory 820 and/or the DRAM 822. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 2. The memory, such as the flash memory 820 and/or the DRAM 822, may be a processor-readable memory and/or a computer-readable memory that stores software code (programming code, instructions, etc.) configured to cause a processor(s) within the CPU/Radio 818 to perform the functions described. In other embodiments, one or more of the functions described may be performed in hardware.

A set of these instructions and/or code might be stored on a non-transitory machine-readable storage medium, such as the flash memory 820 and/or the DRAM 822. In some cases, the storage medium might be incorporated within a computer system, such as the CPU/Radio 818. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 600 and/or might take the form of source and/or installable code, which, upon compilation and/or installation on the network device 600 (e.g., using compilers, installation programs, compression/decompression utilities, etc.) then takes the form of executable code.

It should be appreciated that the network device 600 may have other components than those depicted in FIGS. 6-8. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 9:
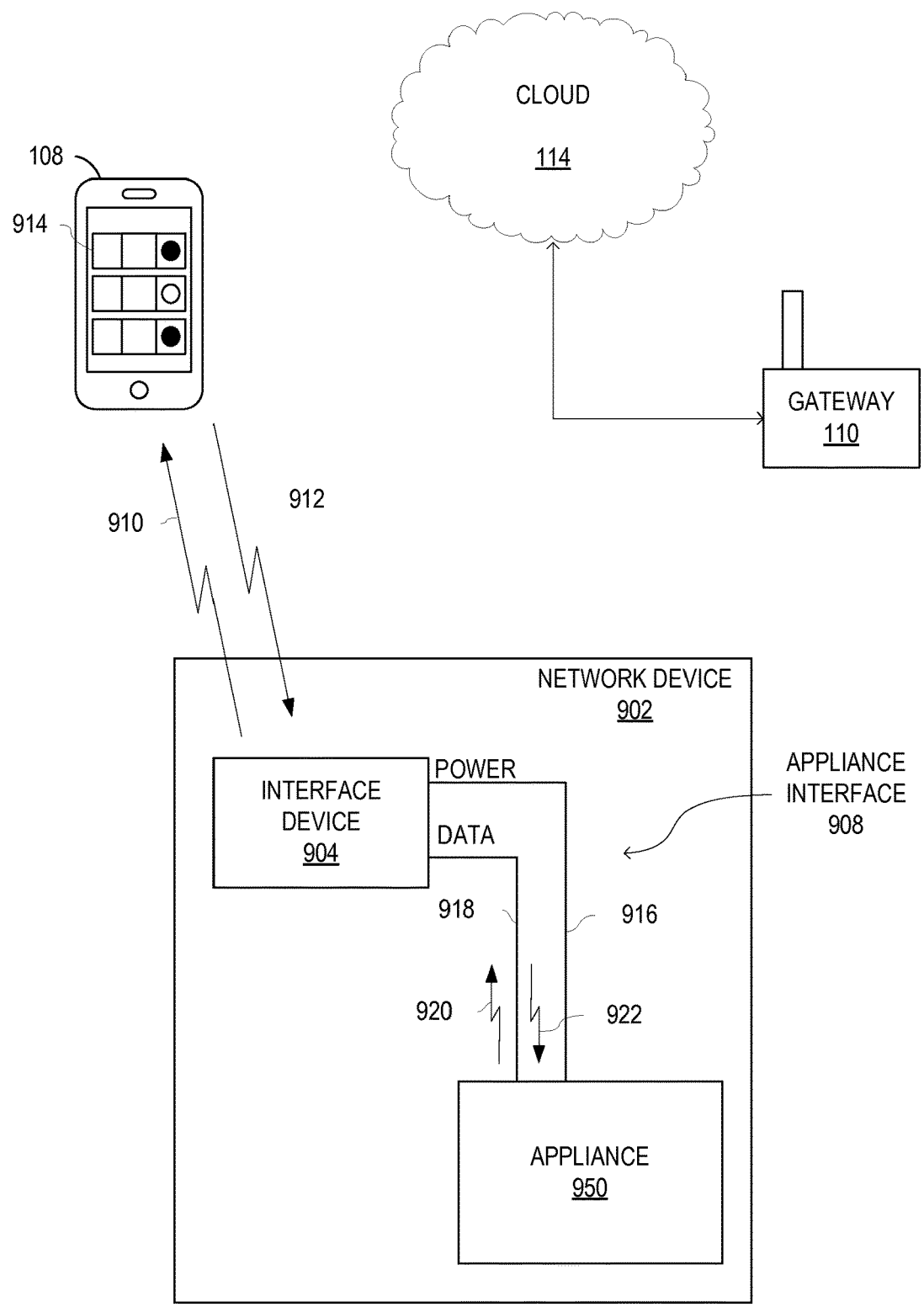
FIG. 9 is a schematic illustration of a local area network including a network device that includes an appliance, in accordance with an embodiment.

FIG. 9 is a schematic illustration of a local area network 900 including a network device 902 that includes an appliance 950. The network device 902 can comprise an interface device 904 and the appliance 950 connected by an appliance interface 908. The appliance interface 908 can include a data connection 918 and a power connection 916. The data connection 918 can be a serial connection (e.g., RS-232, USB, or other), or any other suitable data connection. The interface device 904 can be fully powered by the appliance 902 through the power connection 916, or can have a separate source of power.

The appliance 950 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 950 can be adapted to operate with the interface device 904. The appliance 950 can be any finite state machine. The appliance 950 can, but need not, know or store one or more states related to the appliance. For example, the appliance 950 may know or store data related to whether the appliance 950 is turned on, how long the appliance has been on (or off), among other status data.

The interface device 904 can be positioned within the housing of the appliance 950, or can be attached externally to the appliance 950. The interface device 904 can be removable from the appliance 950, or can be permanently installed in or on the appliance 950.

The interface device 904 can be connected to the local area network 900 through a network interface. The interface device 904 can be connected by a wired or wireless connection (e.g., WiFi, Zigbee, or others described herein or well known). In some embodiments, the interface device 904 can be connected directly to the cloud network 114 through a cellular internet connection (e.g., EDGE, LTE, or others).

The interface device 904 can communicate with another network device, an access device 108, or another client device through the network interface 906. The interface device 904 can transmit a status information signal 910 with status information to the access device 108, and the access device 108 can transmit a network device control signal 912 to the interface device 904. The status information signal 910 and the network device control signal 912 can be transmitted between the interface device 904 and the access device 108 using a telecommunications network (e.g., a cellular network, or other suitable broadband network), using a local area network 900 (e.g., through a gateway 110), or using the cloud network 114, although such a signal may pass through an intermediary device or network to do so.

The interface device 904 can interpret the network device control signal 912 and perform actions based on the contents of the network device control signal 912. The network device control signal 912 can include commands that can be performed by the interface device 904 itself. The network device control signal 912 can also include commands that are to be performed by the appliance 950. Commands that are to be performed by the appliance 950 can include commands like turn on or off, set a desired temperature (e.g., heat up or cool down to 215° F. or any other temperature), or other suitable commands depending on the particular appliance. The interface device 904 can interpret the network device control signal 912 and can send out a command 922, through the data connection 918 of the appliance interface 908, based on the network device control signal 912. The appliance 950 can then perform the command indicated in the network device control signal 912.

The interface device 904 can also transmit commands to the appliance 950 that are not based on a network device control signal received from the access device 108, but are rather based on programming in the interface device 904. Examples of such commands can include commands to update a communication rate, commands to check a state of the appliance 950, commands to set or get a clock time of the appliance 950, or any other suitable commands.

The interface device 904 can receive, through the data connection 918 of the appliance interface 908, a response (e.g., response 920) to any command from the appliance 950. In some examples, the response 920 can include an indication that the command 922 was received. In some examples, the response may include only an indication that a command is received (e.g., an ACK). In some examples, the response 920 can include information for some value on the appliance 950, such as an "on/off" state, a serial number, a product identification, a manufacturer identification, a temperature, a time since live, a setting, or any other value retrievable from the appliance 950. The interface device 904 can interpret the value and can send information about the value (e.g., the state of the appliance is "on," the temperature of the appliance, the time since the appliance first turned on, or other information) as status information (e.g. using status information signal 910) to the access device 108. Additionally, the interface device 904 can send status information about itself (e.g., time since live, supplied power, signal strength, and others) as status information (e.g. using status information signal 910) to the access device 108.

The interface device 904 can also use responses (e.g., response 920) from the appliance 950 to perform additional functions at the interface device 904, such as error handling. In some cases, when performing the additional functions, the interface device 904 does not transmit any status information 910 to the access device 108 based on those particular responses.

The access device 108 can include one or more display tiles (e.g., display tile 914) for displaying information and controls corresponding to the network device 102.

In some embodiments, the interface device 904 can transmit a heartbeat command (e.g., command 922) over the data connection 918 to the appliance 902 to determine whether the appliance 950 is working properly and/or in a state of readiness. If the interface device 904 determines that the appliance 950 has had some sort of failure (e.g., the appliance 950 sends a response 920 indicating a failure or the interface device 904 does not receive any response 920), the interface device 904 can take corrective action (e.g., restarting the appliance 950 or an element of the appliance 950), can log the event, or can alert the user).

Figure 10:
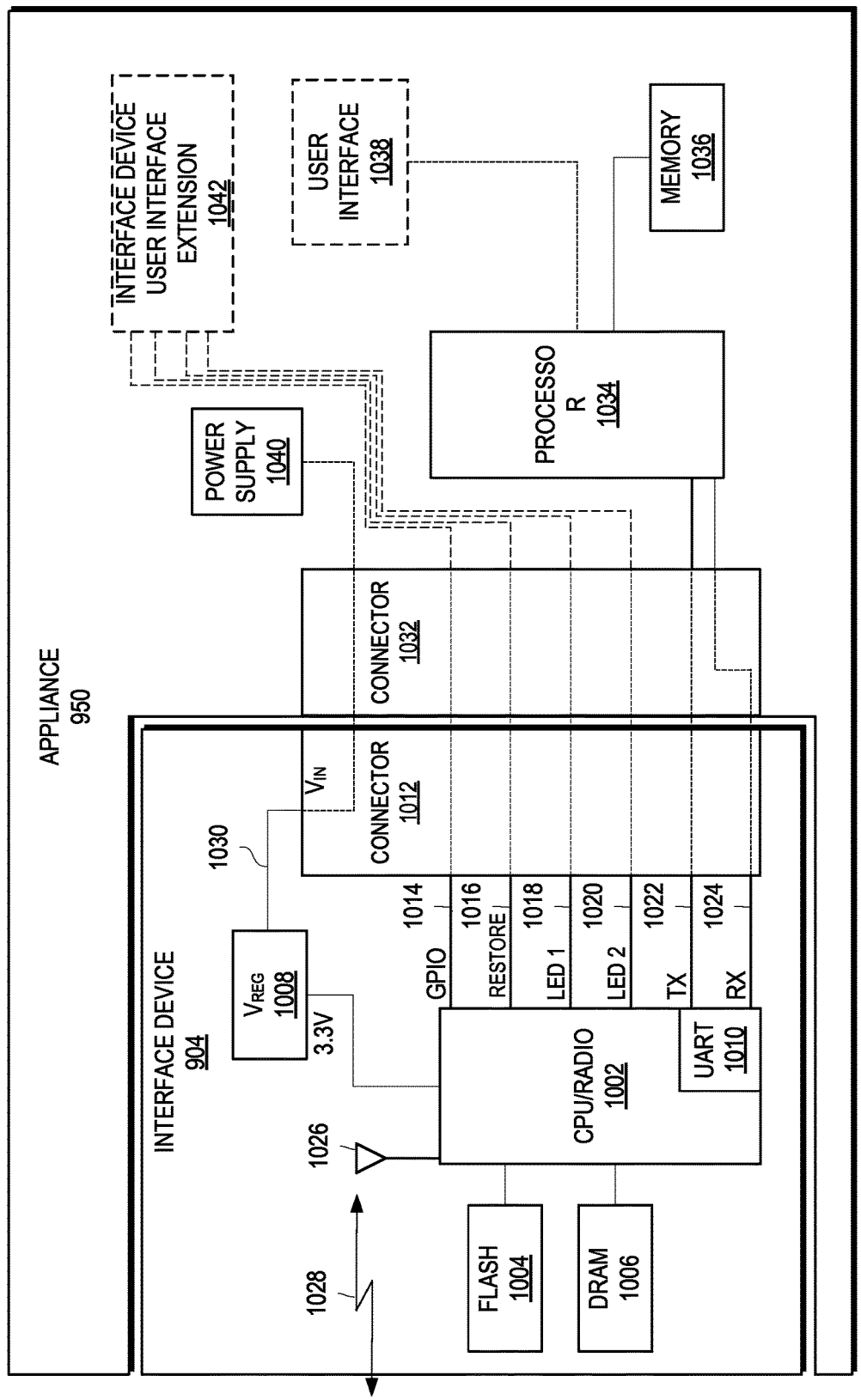
FIG. 10 is an example of a block diagram of a network device including an interface device attached to an appliance, in accordance with an embodiment.

FIG. 10 depicts a block diagram of a network device including an interface device 904 attached to an appliance 950 according to one embodiment. The interface device 904 can include connector 1012 that interacts with connector 1032 of the appliance 950.

The interface device 904 can include flash memory 1004 and dynamic random access memory (DRAM) 1006. The flash memory 1004 may be used to store instructions or code relating to an operating system, one or more applications, and any firmware. The flash memory 1004 can be used to store a cache. The flash memory 1004 may include non-volatile memory so that any firmware or other program can be can updated. In the event the interface device 904 loses power, information stored in the flash memory 1004 may be retained. The DRAM 1006 may store various other types of information needed to run the interface device 904, such as all runtime instructions or code. The flash memory 1004 or DRAM 1006 or a combination thereof may include all instructions necessary to communicate with an appliance 950, including all instructions necessary to communicate using the appliance serial protocol disclosed herein.

The interface device 904 further includes a CPU/Radio 1002. The CPU/Radio 1002 can control the operations of the interface device 904. For example, the CPU/Radio 1002 may execute various applications or programs stored in the flash memory 1004 and/or the dynamic random access memory (DRAM) 1006. The CPU/Radio 1002 may also receive input from the appliance 950, interpret the input, and perform one or more functions in response to the input. The CPU/Radio 1002 may further perform all communications functions in order to allow the interface device 904 to communicate with other network devices, one or more gateways, a cloud network, and/or one or more access devices. The interface device 904 may communicate with other devices and/or networks via antenna 1026. For example, antenna 1026 may include a 2.4 GHz antenna that can transmit and receive WiFi communications signals 1028. The antenna 1026 may include other types of antennas that can communicate Bluetooth® signals, Zigbee® signals, Ultra-Wideband (UWB) signals, and/or the like. In some embodiments, the interface device 904 may include multiple antennas for communicating different types of communication signals.

The CPU/Radio 1002 can include at least one universal asynchronous receiver/transmitter (UART) 1010. The CPU/Radio 903 can use the UART 1010 to send and receive serial communications. The CPU/Radio 903 can send data through a transmit line 1022 and a receive data through a receive line 1024. The CPU/Radio 903 can send and receive data through the transmit line 1022 and receive line 1024 using a serial protocol, such as RS232. The CPU/Radio 1002 can also include an input/output (GPIO) line 1014, a restore line 1016, an LED 1 line 1018, and an LED 2 line 1020. The CPU/Radio 1002 can have additional or fewer lines as necessary. The GPIO line 1014 can be used for any suitable function, such as powering an indicator light on an appliance 950 or accepting an input from the appliance 950. A signal sent on the restore line 1016 can be used to restore the CPU/Radio 1002 and/or the interface device 904 to factory defaults. The LED 1 line 1018 and LED 2 line 1020 can be used to power first and second LEDs that can be used to indicate various statuses, such as whether the interface device has a network connection and whether the interface device is powered on.

The interface device 904 further includes a voltage regulator 1008. The voltage regulator 1008 may be used to convert the voltage output from the appliance 950 to a voltage usable by the CPU/Radio 1002. For example, the voltage regulator 1008 may regulate the DC voltage from 5V to 3.3V. The voltage regulator 1008 can be supplied with power from a power line 1030.

Each of the interface lines, including the GPIO line 1014, the restore line 1016, the LED 1 line 1018, the LED 2 line 1020, the transmit line 1022, the receive line 1024, the power line 1030, and any additional lines, can be routed through connector 1012. Connector 1012 can be a proprietary or universal connector. Any appliance 950 to which the interface device 904 is attached through the connector 1012 can have the necessary hardware to make use of the interface lines, such as to provide power to the power line 1030 and to provide the first and second LEDs that are driven by the LED 1 line 1018 and LED 2 line 1020.

In alternate embodiments, some interface lines are not routed through the connector 1012. For example, the power line 1030 can be routed to a power supply attached directly to the interface device 904, and the LED 1 line 1018 and LED 2 line 1020 can be routed to first and second LEDs located within the interface device 904.

In various embodiments, functions may be stored as one or more instructions or code in memory, such as the flash memory 1004 and/or the DRAM 1006. The interface device 904 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1004 and/or the DRAM 1006, may be a processor-readable memory and/or a computer-readable memory that stores software code (programming code, instructions, etc.) configured to cause a processor(s) within the CPU/Radio 1002 to perform the functions described. In other embodiments, one or more of the functions described may be performed in hardware.

A set of these instructions and/or code might be stored on a computer-readable storage medium, such as the flash memory 1004 and/or the DRAM 1006. In some cases, the storage medium might be incorporated within a computer system, such as the CPU/Radio 1002. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 904 and/or might take the form of source and/or installable code, which, upon compilation and/or installation on the interface device 904 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 904 may have other components than those depicted in FIG. 10. Further, the embodiment shown in the figures are only one example of an interface device that may incorporate an embodiment of the invention. In some other embodiments, interface device 904 may have more or fewer components than shown in the figure, may combine two or more components, or may have a different configuration or arrangement of components.

The appliance 950 can have a processor 1034. The processor 1034 can be a microcontroller, such as a Peripheral Interface Controller (PIC). The appliance 950 can include a memory 1036 (e.g., a flash memory or other) that is readable by the processor 1034. The memory 1036 can include instructions enabling the innate functionality of the appliance 950, such as heating and timing for a crock pot.

The appliance 950 can include a user interface 1038. The user interface 1038 can provide buttons, displays, LEDs, knobs, and other input and output elements necessary for a user to interact with the appliance 950. For example, a user interface 1038 for a slow cooker can include a display, a power button, a temperature adjustment button, and a start button. The user interface 1038 can be driven and/or monitored by the processor 1034. In some embodiments, the appliance 950 is "headless" or has no user interface 1038.

The appliance 950 can include a power supply 1040 that can provide power to the voltage regulator 1038 of the interface device 904 through connector 1032, connector 1012, and power line 1030.

The appliance 950 can include an interface device user interface extension 1042. The interface device user interface extension 1042 can include various input and output elements that are passed directly to the interface device 904 without being processed by the processor 1034. Examples of input and output elements of the interface device user interface extension 1042 include LEDs associated with the LED 1 line 1018 and LED 2 line 1020, a hardware restore button associated with the restore line 1016, or any other suitable input/output element.

Figure 11:
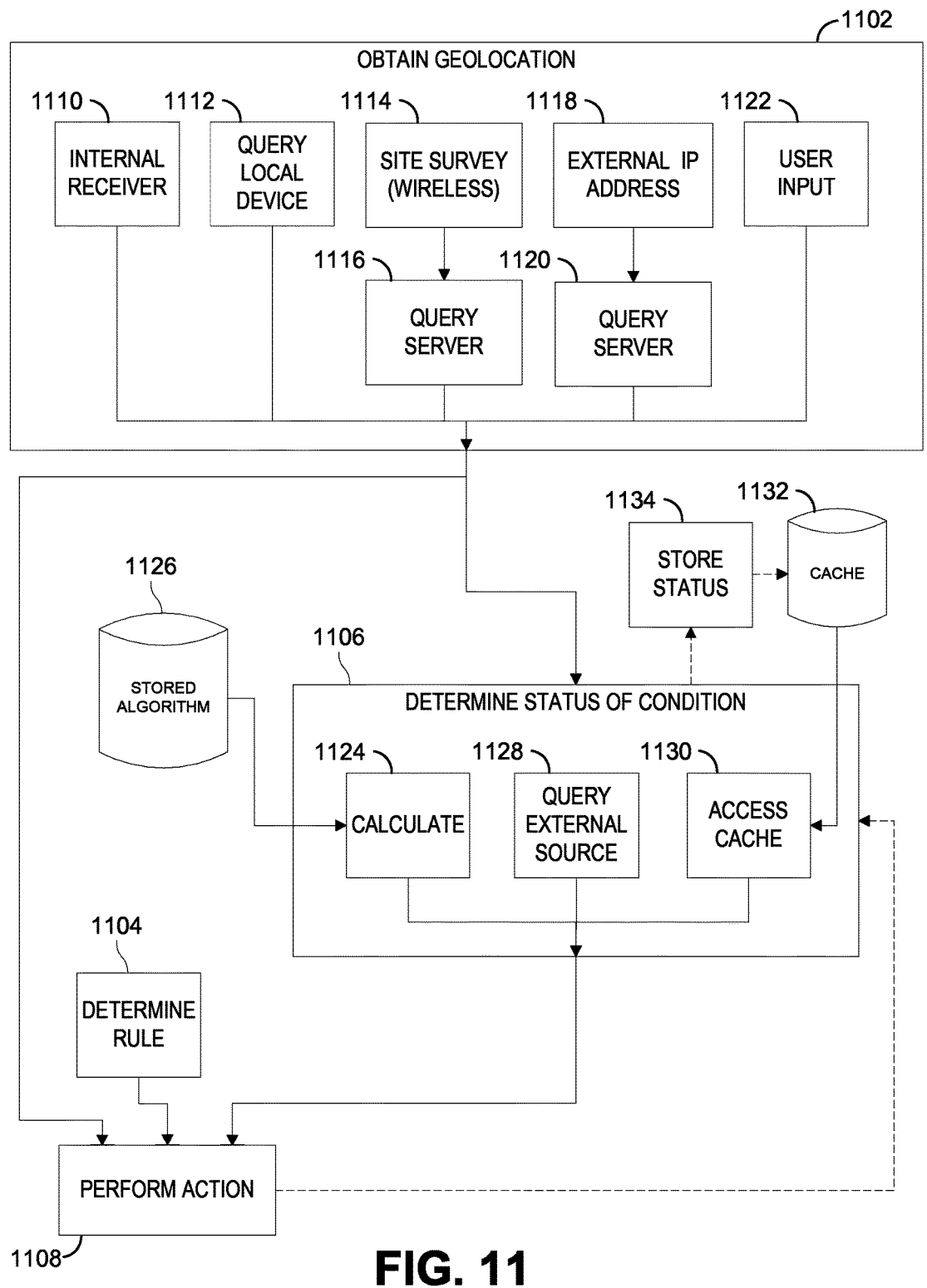
FIG. 11 is a block diagram illustrating performing rule-based actions based on a geolocation-dependent condition according to one embodiment.

FIG. 11 is a block diagram illustrating performing rule-based actions based on a geolocation-dependent condition according to one embodiment. The various actions can be performed by a network device, as described above. An action is performed at block 1108 based on obtaining a geolocation as block 1102, determining a rule at block 1104, and determining a status of a condition at block 1106. In some embodiments, the same or a different action is performed 1108 based on determining an updated status of the condition at block 1106, without changing the geolocation or rule.

In use, a user can program a network device with a rule based on a condition. The network device can obtain a geolocation at block 1102. The network device can then determine the status of the condition at block 1106, where the status of the condition is related to or based on the geolocation. The network device can then perform an action at block 1108, based on the geolocation, the updated status of the condition, and the rule.

At block 1102, a geolocation is obtained. The geolocation can be any representation of a physical location, such as a terrestrial location (e.g., a street address or a specific longitude and latitude). The geolocation can be obtained in any suitable way, such as through an internal receiver at block 1110 (e.g., a global positioning satellite (GPS) receiver and/or other location-determining receivers), by querying a local device at block 1112 (e.g., receiving and using another device's geolocation, such as the geolocation of a network device or an access device), by performing a site survey at block 1114 (e.g., a wireless network site survey) and querying a server with the results of the site survey at block 1116 to determine an approximate location; by determining the external internet protocol (IP) address of the network device at block 1118 and querying a server at block 1120 to determine an approximate location of the external IP address; or by accepting user input at block 1122 (e.g., by providing a prompt to a user on an access device, such as asking for the user's address, city, or zip code). Additionally, when a user provides user input at block 1122, the user input can be processed by the network device and/or a server to translate the user input into a location (e.g., to translate a city name into approximate longitude and latitude coordinates). Other ways of determining a geolocation can be used.

In some embodiments, the geolocation is the location of the network device itself. In other embodiments, the geolocation is the location of an access device. In some embodiments, the geolocation is a location of another networked device. In yet other embodiments, the geolocation is a desired location set by the user, which may be unrelated to the location of the network device (e.g., a common traffic route the user takes to and from work every day or a location of the user's work).

A geolocation can be obtained from one or multiple of the aforementioned sources. In some embodiments where a geolocation is obtained from multiple of the aforementioned sources, a priority and/or weighting of the sources can be established such that more accurate and/or more desirable sources overrule or outweigh less accurate and/or less desirable sources. For example, a user's input at block 1122 can have the highest priority, querying a local device at block 1112 can have a lower priority, using an internal receiver at block 1110 can have a lower priority, performing a site survey at block 1114 can have a lower priority, and querying a server at block 1120 based on an external IP address can have the lowest priority. Other priority rankings can be used.

At block 1104, a rule is determined. The rule can be determined by a user's input, such as through prompts on an access device. In some embodiments, the rule can be pre-installed on the network device. In some embodiments, the rule can be "pushed" from a cloud or downloaded to the network device from an external source (e.g., an external server). In yet other embodiments, the rule can be "pushed" to the network device or downloaded by the network device from another network device on the local network.

The rule can include an action to be performed and a condition upon which the rule is based. As described above, a condition can be any variable capable of having a first status and an updated status.

At block 1106, a status of the condition is determined. A status of the condition can include any information about the condition. For example a status of a sunrise condition can be a sunrise time associated with a particular date. A sunrise condition can therefore have an updated status every day for each sunrise time on each successive day. An example of another condition is a stock symbol, which can include updated status every time the stock price is updated or occasionally when a stock price is updated. Other information about the stock symbol can be tracked using status (e.g., volume of trading or when news about the stock symbol appears). An example of another condition is travel time between home and work, which can have status information (e.g., travel time in minutes) that is updated occasionally based on external sources that detect relevant factors, such as traffic, rainfall, road closures, and other such factors.

At block 1124, a status of a condition can be calculated, generally based on a stored algorithm 1126. Any predictable condition can be calculated, such as sunrise/sunset times. A stored algorithm can provide estimates for when a status of a condition will change and/or what a status of a condition will be at a later time.

At block 1128, the network device can query an external source to determine the status of the condition. The external source can be an external server on the internet, the cloud, another network device, an access device, or another suitable external source. The query can include the geolocation.

At block 1130, the network device can access a cache 1132 of the network device to retrieve one or more stored updated statuses of the condition. In some embodiments, the network device can obtain an updated status of the condition by calculating the updated statuses at block 1124 or querying an external source at block 1128, then the network device can store one or more updated statuses to the cache at block 1134. For example, a network device can calculate a year's worth of upcoming sunset times at block 1124, then store those updated statuses to the cache 1132 at block 1134. In another example, a network device can query an external server at block 1128 to download the predicted rainfall over the course of the next week (e.g., updated statuses related to the condition "rainfall") and store those updated statuses to the cache 1132 at block 1134. In alternate embodiments, the cache 1132 can be pre-populated with updated status or can be written to by another network device, access device, or external source (e.g., "pushed"). In some embodiments, the network device can simply query another network device at block 1128 and copy the cached status updates of that other network device to the present network device's own cache 1132 at block 1134.

Figure 12:
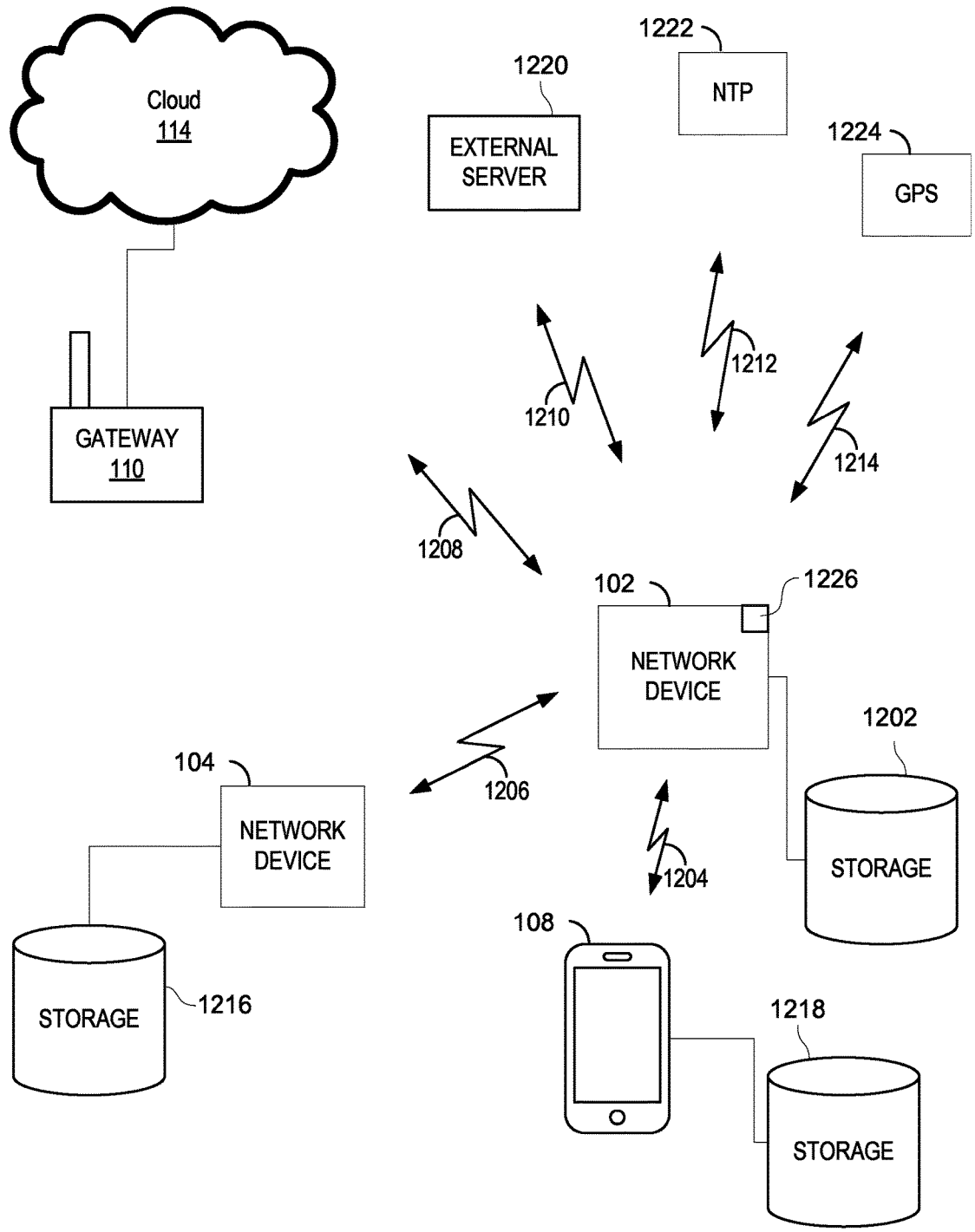
FIG. 12 is a block diagram illustrating various techniques for controlling a network device based on conditions according to one embodiment.

FIG. 12 is a block diagram illustrating various techniques for controlling a network device 102 based on conditions according to one embodiment. The network device 102 can include a storage 1202 that can contain various cached information, as described in further detail above.

The network device 102 can obtain a geolocation through various techniques, as described above. The network device 102 can use an internal receiver to receive communication 1214 from one or more GPS satellites 1224. The network device 102 can send and receive communication 1206 between a local network device 104 on the same network to obtain the geolocation of network device 104, which can be stored in storage 1216 of network device 104. The network device 102 can perform a site survey and/or obtain an external IP address and send and receive communication 1210, 1208 through a gateway 110 to an external server 1220 on the internet or a cloud 114 in order to determine an approximate location. The network device 102 can obtain geolocation from an access device 108 by sending/receiving communication 1204, such as by obtaining the information from a storage 1218 of the access device 108 or by obtaining user input through the access device 108. Any combination of these techniques can be used to obtain geolocation information. Other techniques can additionally be used to obtain geolocation information.

Storage 1202 can additional contain a rule to be evaluated by the network device 102. The rule can be sent via communication 1204 from the access device 108, for example after being entered by a user on a program running on the access device 108. The rule can also be sent (e.g., "pushed") or retrieved directly from or to another network device 104 on the server through communication 1206. The rule can also be sent (e.g., "pushed") or retrieved from the cloud 114 or an external server 1220 through communication 1208, 1210.

The network device 102 can include an internal clock 1226 for determining when to perform time-based rules (e.g., turn on at sunset). In some embodiments, the internal clock 1226 is a realtime clock. In other embodiments, the internal clock 1226 is a relative clock. A relative clock can be synchronized with another device, such as an access device 108 via communication 1204, a local network device 104 via communication 1206, a gateway 110 via communication 1208, an external server 1220 via communication 1210, a server on the cloud 114 via communication 1208, or a GPS satellite 1224 via communication 1214. Additionally, an internal clock can be synchronized with a Network Time Protocol (NTP) server 1222 via communication 1222.

The status of the condition can be determined by the network device 102 by internal calculation, as described above, by retrieving updated statuses from its storage 1202, or by querying an external source, such as an access device 108, another network device 104, a gateway 110, the cloud 114, an external server 1220, or other suitable sources. Updated statuses can be stored in storage 1202 for later retrieval.

Figure 13:
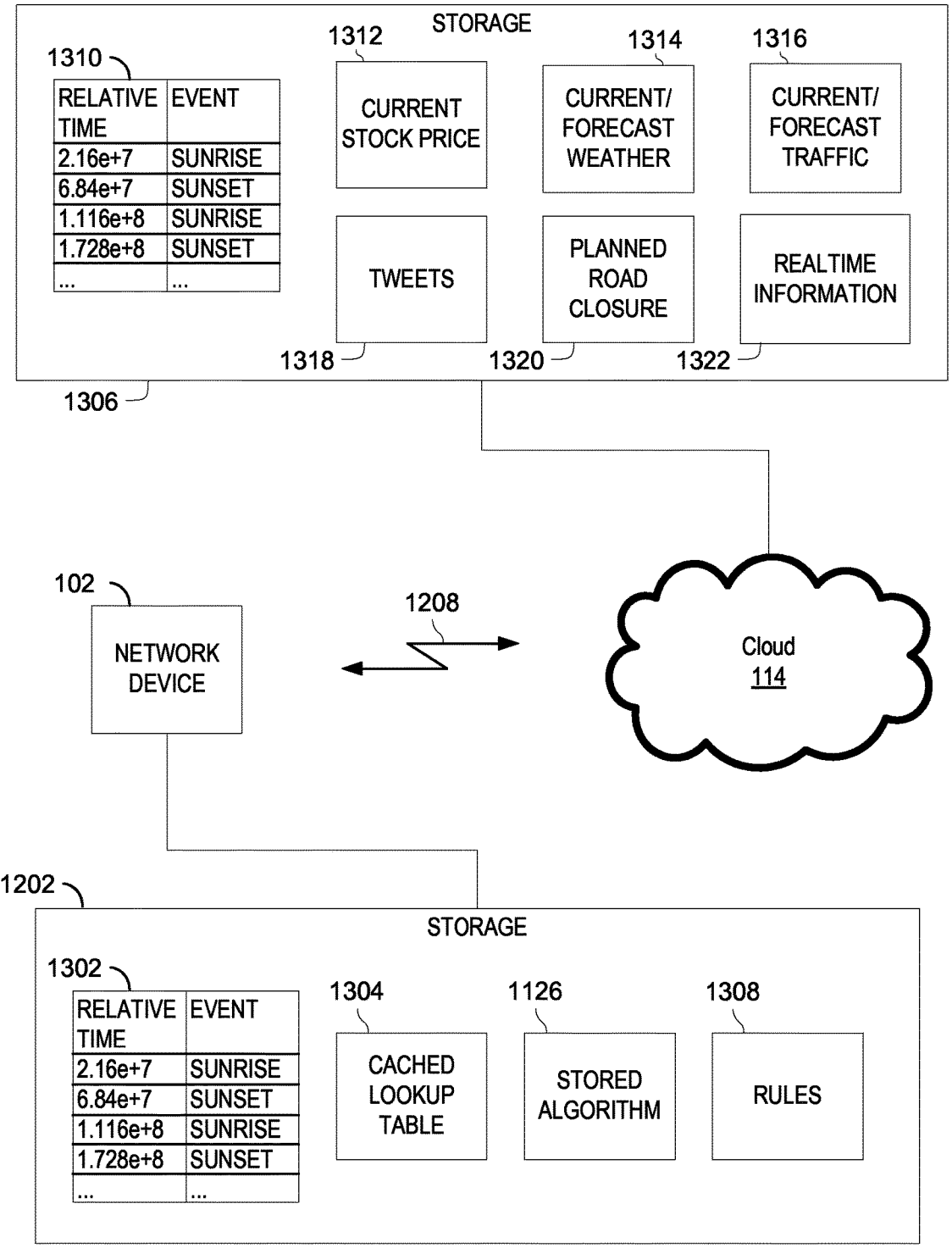
FIG. 13 is a block diagram illustrating a network device communicating with the cloud according to one embodiment.

FIG. 13 is a block diagram illustrating a network device 102 communicating with the cloud 114 according to one embodiment. The network device 102 can include storage 1202. Storage 1202 can include any rules 1308 that the network device 102 is to evaluate. Storage 1202 can also include a stored algorithm 1226 the network device 102 can use to calculate updated statuses. Storage 1202 can also include a cached lookup table 1304 of updated statuses that has been previously stored on storage 1202. The network device 102 can retrieve updated statuses from the cached lookup table 1304 as necessary. For example, sunrise/sunset table 1302 is an example of a cached lookup table 1304, containing relative times for events such as sunrise and sunset. While relative times are shown in the sunrise/sunset table 1302, real times (e.g., 5:33 am) can be used instead. Additionally, indices and statuses can be stored in a cached lookup table 1304.

The network device 102 can communicate with cloud 114 via communication 1208. The network device 102 can retrieve updated status information from storage 1306 of the cloud 114. Storage 1306 can be distributed across one or many servers on the cloud 114. While described herein with reference to the cloud 114, storage 1306 can be accessible to the network device 102 from any server on the Internet or local area network.

The network device 102 can access status update information in storage 1306 for purposes of evaluating a rule to perform a rule-based action, or to store in storage 1202 for later retrieval. Storage 1306 can contain existing lookup tables, such as an updated sunrise/sunset table 1310. Storage 1306 can contain current stock price information 1312, tweet information 1318, current and/or forecast weather information 1314, current and/or forecast traffic information 1316, current and/or planned road closure information 1320, or any other realtime information 1322 accessible through the cloud 114 and/or the Internet. Network device 102 can use these various updated statuses to drive the rule-based actions described above.

Figure 14:
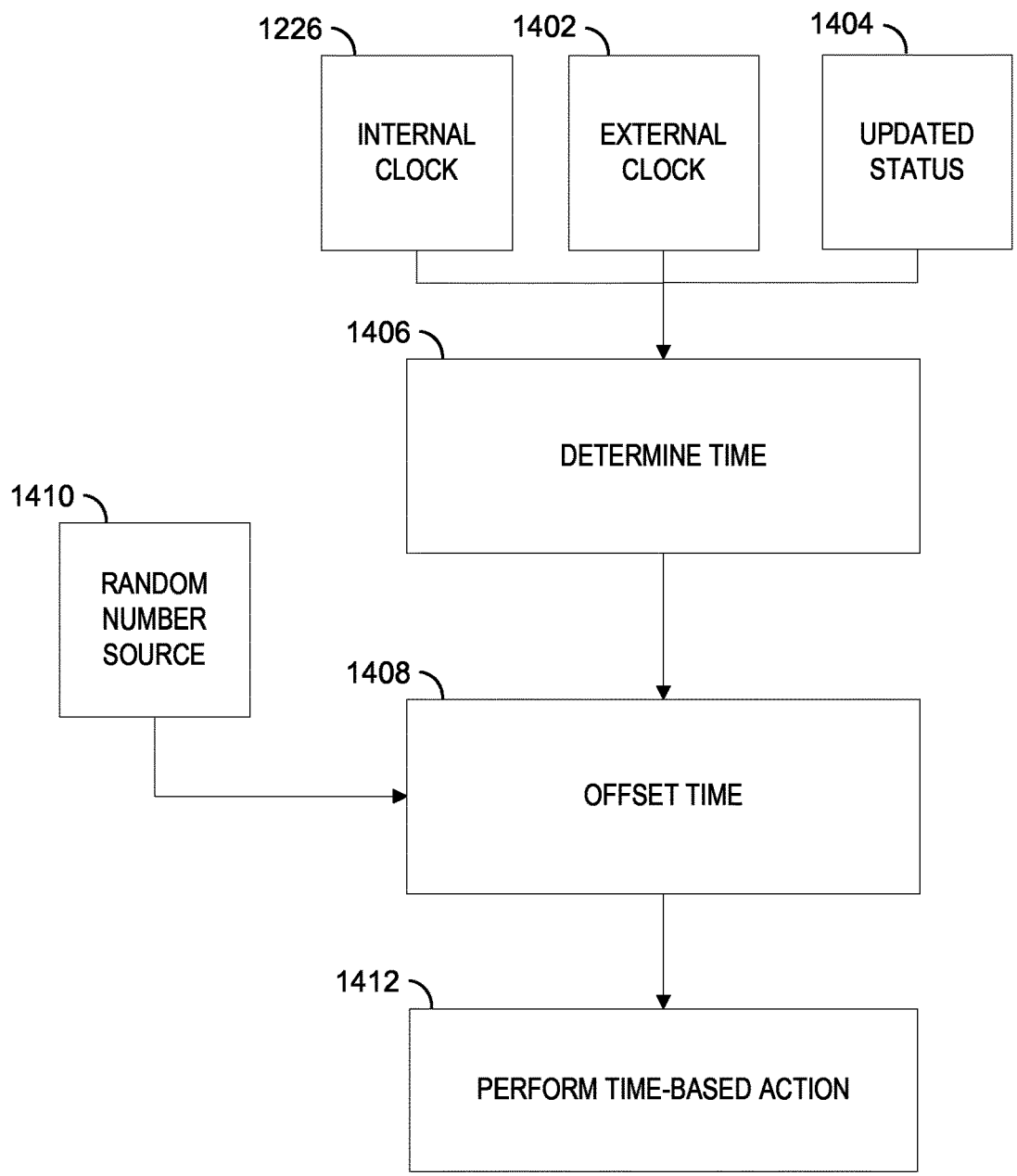
FIG. 14 is a block diagram illustrating a technique for performing randomized time-based actions according to one embodiment.

FIG. 14 is a block diagram illustrating a technique 1400 for performing randomized time-based actions according to one embodiment. A network device can before randomized time-based actions predicated off of above-described condition-dependent rules involving a time component. Time-based rules can be based on realtime or relative time. At block 1406, the network device can determine a time (e.g., a real time, such as 3:03 PM, or a relative time, such as 1.33e+7 milliseconds). The time can be based off of an internal clock 1226, an external clock 1402, or an updated status 1404. In embodiments where the time is based off an internal clock 1226 or an external clock 1402, the network device can be offsetting the time that it compares to an updated status when performing a condition-dependent rule. In embodiments where the time is based off an updated status 1404, the network device can be offsetting the time at which the updated status 1404 will be triggered (e.g., if actual sunset is at 8:37 PM, the time can be offset to 8:32 PM and the sunset action will be performed at 8:32 PM). The external clock 1402 can be a clock of an access device, another network device, a server on the internet, such as an NTP server, a gateway, a GPS satellite, a cloud, or another suitable source external to the network device itself.

At block 1408, the network device can offset the determined time based on output from a random number source 1410. The random number source 1410 can be a true random number generator or a pseudo-random number generator. The random number source 1410 can be software-based or hardware-based. The random number source 1410 can be any source of generally random or pseudo-random information capable of generating a time offset. At block 1408, the network device can process the output of the random number source 1410 to a time offset and apply that time offset to the determined time to result in an offset time.

At block 1412, the network device can perform a time-based action based on the offset time. An example of a time-based action includes turning on a light at sunset. An example in one embodiment includes a network device determining, at block 1406, that an updated status 1404 of the sunset time condition is 8:52 PM. At block 1408, the network device processes the output from the random number source 1410 to offset the determined time, for example resulting in an offset time of 8:44 PM. At block 1412, the network device will turn on the lights at 8:44 PM, based on the offset time from block 1408.

Figure 15:
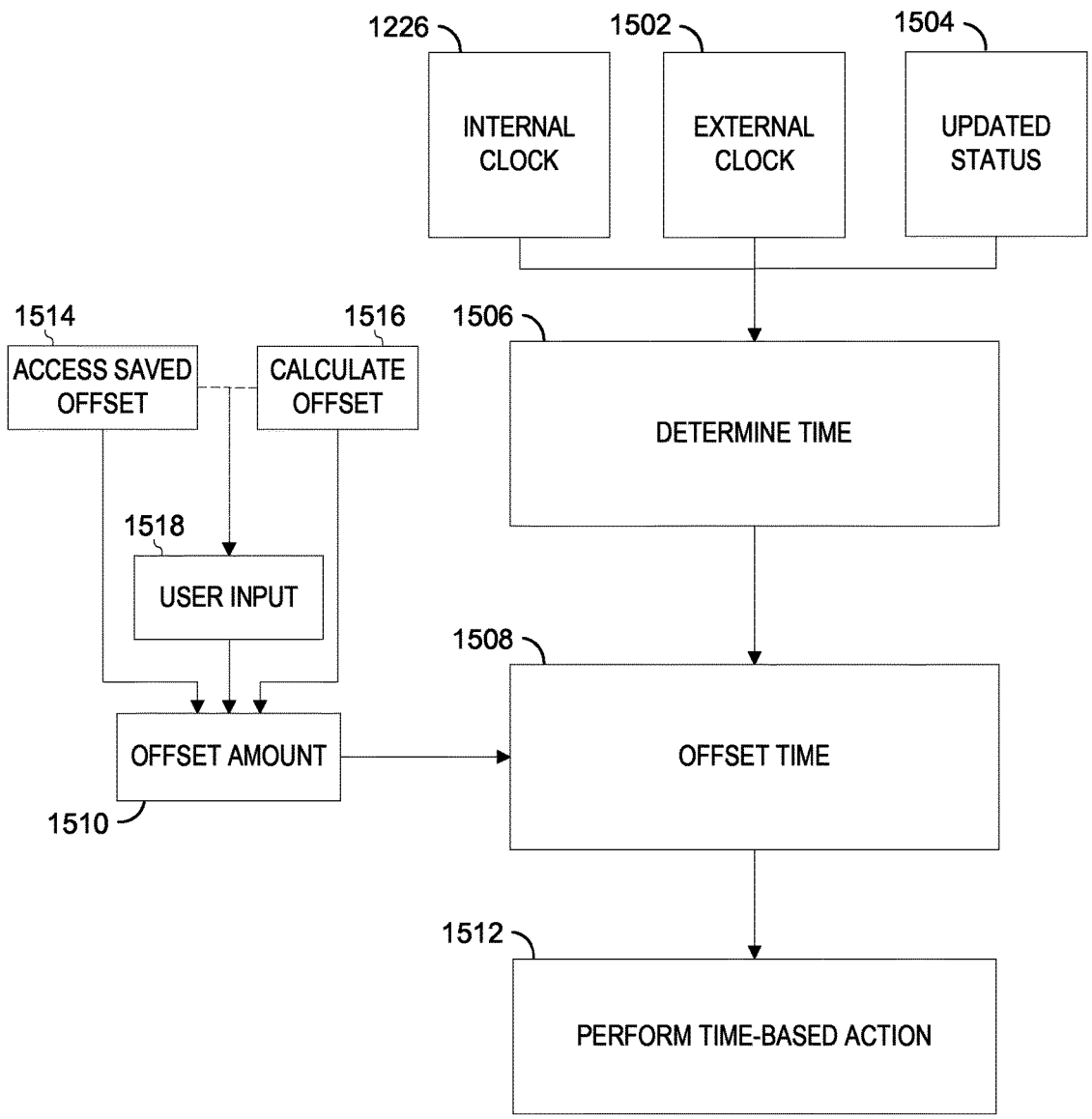
FIG. 15 is a block diagram illustrating a technique for performing offset time-based actions according to one embodiment.

FIG. 15 is a block diagram illustrating a technique 1500 for performing offset time-based actions according to one embodiment. A network device can delay (e.g., add an offset) or perform earlier (e.g., subtract an offset) an action indicated by a condition-dependent rule including a time component. Time-based rules can be based on realtime or relative time. At block 1506, the network device can determine a time (e.g., a real time, such as 3:03 PM, or a relative time, such as 1.33e+7 milliseconds). The time can be based off of an internal clock 1226, an external clock 1502, or an updated status 1504. In embodiments where the time is based off an internal clock 1226 or an external clock 1502, the network device can be offsetting the time that it compares to an updated status when performing a condition-dependent rule. In embodiments where the time is based off an updated status 1504, the network device can be offsetting the time at which the updated status 1504 will be triggered (e.g., if actual sunset is at 8:37 PM, the time can be offset to 8:32 PM and the sunset action will be performed at 8:32 PM). The external clock 1502 can be a clock of an access device, another network device, a server on the internet, such as an NTP server, a gateway, a GPS satellite, a cloud, or another suitable source external to the network device itself.

At block 1508, the network device can offset the determined time based on an offset amount 1510. The offset amount 1510 can be a number representing an amount of time that can be added (e.g., when an action is to be performed after a certain time) or subtracted (e.g., when an action is desired to be performed before a certain time) at block 1508.

In an embodiment, the offset amount 1510 can be obtained by accessing a saved offset at block 1514, such as from a database of offset values. The saved offset can be accessed from another network device, an access device, an external server, or other device. The saved offset can be based on offsets previously used by a particular user. The saved offset can be based on offsets previously used by other network devices on the same logical network. The saved offset can be based on offsets previously used by the network device. The saved offset can be based on offsets used for other network devices sharing a similar or nearby geolocation. For example, for a network device located in a particular geolocation, the saved offset that is used with a "turn on at sunset" type rule can be an average of offset amounts for similar rules as used by other users in geolocations nearby the particular geolocation of the network device.

In an embodiment, the offset amount 1510 can be obtained by calculating an offset at block 1516. The calculated offset can be determined to be a close estimate for what offset a user may desire for a particular type of rule. For example, a "turn on at sunset" type rule can have a calculated offset based on geolocation, topographical information near the geolocation, and an estimated sun path in the sky. The calculated offset can access topographical information from a cache, an external server or another device to determine topographical features near the geolocation, such as buildings, ridges, or other manmade or natural features. An estimation of the sun's path in the sky for a particular day and time can be calculated. A comparison can be made of the estimated sun path and the topographical information near the geolocation to determine a time of apparent sunset or sunrise. The offset amount can be the difference between the time of apparent sunset or sunrise and the actual sunset or sunrise time calculated as described above. Calculations can occur on the network device, on an access device, on an external server, or on another device.

In an embodiment, the offset amount 1510 can be obtained through user input at block 1518. User input can be provided through an access device, the network device, or another device. A user can provide user input at block 1518 as a specific amount (e.g., 20 minutes). A user can input a particular amount or select from one or more of suggested amounts. In some embodiments, providing user input at block 1518 includes providing the user with one or more suggested amounts based on accessing saved offset amounts at block 1514, calculating offset amounts at block 1516, or both. The user can approve the suggested amount, adjust the suggested amount, or provide a different offset amount.

At block 1508, the network device can apply the offset amount 1510 to the determined time to result in an offset time.

At block 1512, the network device can perform a time-based action based on the offset time. An example of a time-based action includes turning on a light at sunset. An example in one embodiment includes a network device determining, at block 1506, that an updated status 1504 of the sunset time condition is 8:52 PM. At block 1508, the network device adjusts the determined time by the offset amount 1510 (e.g., an offset amount calculated at block 1516), for example resulting in an offset time of 8:44 PM. At block 1512, the network device will turn on the lights at 8:44 PM, based on the offset time from block 1508.

Figure 16:
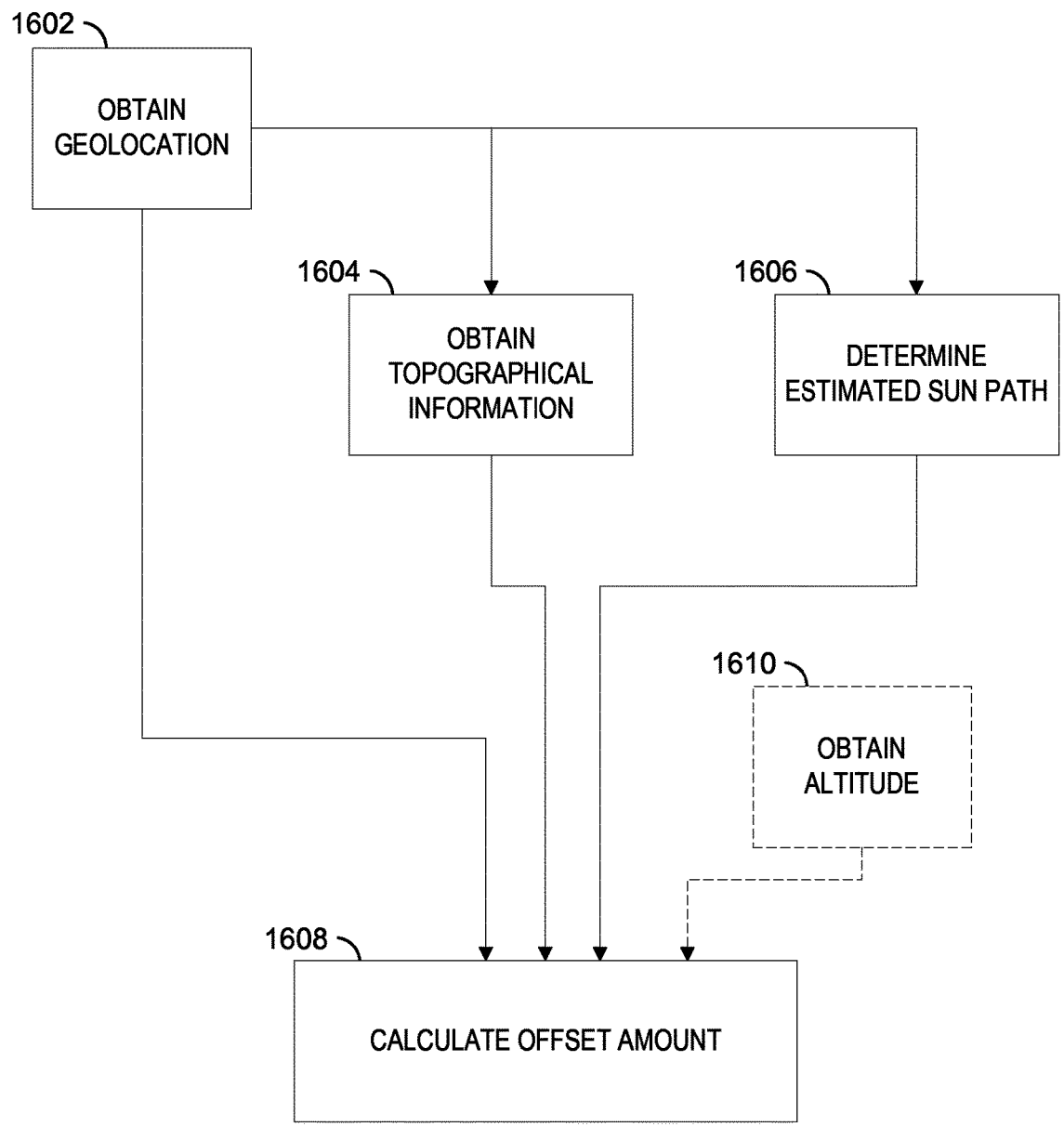
FIG. 16 is a block diagram illustrating a technique for calculating an offset amount according to one embodiment.

FIG. 16 is a block diagram illustrating a technique 1600 for calculating an offset amount according to one embodiment. At block 1602, a geolocation is obtained, as described above. The geolocation can be used to obtain topographical information at block 1604 and to determine an estimated sun path at block 1606. The topographical information can be obtained from external servers. The estimated sun path can be calculated by a network device, an access device, an external server, or other device. At block 1608, an offset amount can be calculated based on the geolocation, topographical information, and estimated sun path.

In an embodiment, an altitude can be determined at block 1610. The altitude can be a measured altitude, such as measured by an altitude sensor located in a network device or an access device. The altitude can be an input device, such as provided by user input. The altitude can be an estimated altitude, such as an altitude estimated from the geolocation on a topographical map, optionally including any increase based on relative changes in pressure from pressure expected at the surface at that geolocation (e.g., the increase can be indicative of a network device placed on the second floor of a building located at that geolocation). In some embodiments, the offset amount calculated at block 1608 be calculated based on the geolocation, topographical information, estimated sun path, and altitude.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

Substantial variations may be made in accordance with specific requirements. For example, particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising obtaining, by a computing device, a geolocation; determining a current status of a condition based on the geolocation of the computing device; determining a rule for performing an action by the computing device; performing the action based on the current status of the condition, the geolocation, and the rule; determining an updated status of the condition; and automatically performing the action based on the updated status of the condition, the geolocation, and the rule.

Example 2 is the method of example 1, wherein the geolocation is based on a location of the computing device.

Example 3 is the method of examples 1 or 2, wherein determining the updated status of the condition includes querying an external source for the updated status of the condition.

Example 4 is the method of example 3, further comprising synchronizing an internal clock of the computing device with a source clock of the external source.

Example 5 is the method of examples 3 or 4, wherein querying an external source includes obtaining the updated status of the condition from a local network device.

Example 6 is the method of examples 1-5, wherein determining the updated status of the condition includes calculating the updated status using the geolocation and a stored algorithm.

Example 7 is the method of examples 1-6, wherein obtaining the geolocation includes determining a second geolocation corresponding to a local device, wherein the geolocation is based on the second geolocation.

Example 8 is the method of examples 1-7, further comprising saving the current status of the condition and the updated status of the condition.

Example 9 is the method of examples 1-8, wherein the condition is related to solar time, wherein the current status of the condition is a first sunrise/sunset time, and wherein the updated status of the condition is a subsequent sunrise/sunset time.

Example 10 is the method of examples 1-2 or 6-9, further comprising:
synchronizing an internal clock of the computing device with a source clock of an external source.

Example 11 is a system, comprising one or more data processors; and a non-transitory computer-readable storage medium containing instructions which when executed on the one or more data processors, cause the one or more data processors to perform operations including: obtaining, by a computing device, a geolocation; determining a current status of a condition based on the geolocation of the computing device; determining a rule for performing an action by the computing device; performing the action based on the current status of the condition, the geolocation, and the rule; determining an updated status of the condition; and automatically performing the action based on the updated status of the condition, the geolocation, and the rule.

Example 12 is the system of examples 11, wherein the geolocation is based on a location of the computing device.

Example 13 is the system of examples 11 or 12, wherein determining the updated status of the condition includes querying an external source for the updated status of the condition.

Example 14 is the system of example 13, wherein the operations further include synchronizing an internal clock of the computing device with a source clock of the external source.

Example 15 is the system of examples 13 or 14, wherein querying an external source includes obtaining the updated status of the condition from a local network device.

Example 16 is the system of examples 11-15, wherein determining the updated status of the condition includes calculating the updated status using the geolocation and a stored algorithm.

Example 17 is the system of examples 11-16, wherein obtaining the geolocation includes determining a second geolocation corresponding to a local device, wherein the geolocation is based on the second geolocation.

Example 18 is the system of examples 11-17, wherein the operations further include saving the current status of the condition and the updated status of the condition.

Example 19 is the system of examples 11-18, wherein the condition is related to solar time, wherein the current status of the condition is a first sunrise/sunset time, and wherein the updated status of the condition is a subsequent sunrise/sunset time.

Example 20 is the system of examples 11, 12, or 16-19, wherein the operations further include synchronizing an internal clock of the computing device with a source clock of an external source.

Example 21 is a computer-program product tangibly embodied in a non-transitory machine-readable storage medium, including instructions configured to cause a data processing apparatus to perform operations including: obtaining, by a computing device, a geolocation; determining a current status of a condition based on the geolocation of the computing device; determining a rule for performing an action by the computing device; performing the action based on the current status of the condition, the geolocation, and the rule; determining an updated status of the condition; and automatically performing the action based on the updated status of the condition, the geolocation, and the rule.

Example 22 is the computer-program product of example 21, wherein the geolocation is based on a location of the computing device.

Example 23 is the computer-program product of examples 21 or 22, wherein determining the updated status of the condition includes querying an external source for the updated status of the condition.

Example 24 is the computer-program product of example 23, wherein the instructions further include synchronizing an internal clock of the computing device with a source clock of the external source.

Example 25 is the computer-program product of examples 23 or 24, wherein querying an external source includes obtaining the updated status of the condition from a local network device.

Example 26 is the computer-program product of examples 21-25, wherein determining the updated status of the condition includes calculating the updated status using the geolocation and a stored algorithm.

Example 27 is the computer-program product of examples 21-26, wherein obtaining the geolocation includes determining a second geolocation corresponding to a local device, wherein the geolocation is based on the second geolocation.

Example 28 is the computer-program product of examples 21-27, wherein the instructions further include saving the current status of the condition and the updated status of the condition.

Example 29 is the computer-program product of examples 21-28, wherein the condition is related to solar time, wherein the current status of the condition is a first sunrise/sunset time, and wherein the updated status of the condition is a subsequent sunrise/sunset time.

Example 30 is the computer-program product of examples 21, 22, or 26-29, wherein the instructions further include synchronizing an internal clock of the computing device with a source clock of an external source.

What is claimed is:

1. A computer-implemented method, comprising:
   obtaining, by a computing device, a geolocation;
   determining a current status of a condition using the geolocation of the computing device, wherein the current status is indicative of a value, and wherein the condition is a geolocation-dependent variable;
   determining a rule for performing an action by the computing device, wherein the rule includes information for determining an offset;
   dynamically determining the offset using the rule;
   applying the offset to the value of the current status to generate an offset status;
   performing the action based on the offset status, the geolocation, and the rule;
   determining an updated status of the condition;
   automatically performing the action based on the updated status of the condition, the geolocation, and the rule; and
   transmitting a status update associated with the action through a network interface of the computing device, wherein the status update, when received by an access device, is usable to generate an indication of the performance of the action based on the updated status.

2. The method of claim 1, wherein the geolocation is based on a location of the computing device.

3. The method of claim 1, wherein determining the updated status of the condition includes querying an external source for the updated status of the condition.

4. The method of claim 1, further comprising:
   saving the current status of the condition and the updated status of the condition.

5. The method of claim 1, wherein the condition is related to solar time, wherein the current status of the condition is a first sunrise/sunset time, and wherein the updated status of the condition is a subsequent sunrise/sunset time.

6. The method of claim 1, further comprising applying the offset to a value of the updated status to generate an offset updated status, and wherein automatically performing the action based on the updated status of the condition includes automatically performing the action based on the offset updated status.

7. The method of claim 6, further comprising updating the offset prior to applying the offset to the updated status.

8. The method of claim 1, wherein the condition is a location-dependent variable capable of having the current status and the updated status, and wherein determining the current status includes dynamically applying the geolocation to the location-dependent variable to obtain the current status.

9. The method of claim 1, wherein dynamically determining the offset includes:
   automatically transmitting a request for a pre-calculated offset, wherein the request includes the geolocation; and
   receiving the pre-calculated offset, wherein the pre-calculated offset is selected using the geolocation.

10. The method of claim 1, wherein dynamically determining the offset includes:
    receiving existing offset information associated with one or more network devices, wherein the one or more network devices share a logical network with the computing device, and wherein the offset information stored by the one or more network devices is used by the one or more network devices to offset an additional value of an additional current status to generate an additional offset status which is used by the one or more network devices to perform an additional action associated with the one or more network devices; and
    determining the offset using the existing offset information.

11. The method of claim 1, further comprising:
    transmitting a request to confirm the dynamically determined offset;
    receiving a response to the request to confirm; and
    adjusting the offset based on the response to the request to confirm.

12. The method of claim 1, further comprising obtaining topographical information or altitude information associated with the geolocation, wherein dynamically determining the offset using the rule includes using the topographical information or the altitude information.

13. A system, comprising:
    one or more data processors; and
    a non-transitory computer-readable storage medium containing instructions which when executed on the one or more data processors, cause the one or more data processors to perform operations including:
    obtaining, by a computing device, a geolocation;
    determining a current status of a condition using the geolocation of the computing device, wherein the current status is indicative of a value, and wherein the condition is a geolocation-dependent variable;
    determining a rule for performing an action by the computing device, wherein the rule includes information for determining an offset;
    dynamically determining the offset using the rule;
    applying the offset to the value of the current status to generate an offset status;
    performing the action based on the offset status, the geolocation, and the rule;
    determining an updated status of the condition;
    automatically performing the action based on the updated status of the condition, the geolocation, and the rule; and transmitting a status update associated with the action through a network interface of the computing device, wherein the status update, when received by an access device, is usable to generate an indication of the performance of the action based on the updated status.

14. The system of claim 13, wherein the geolocation is based on a location of the computing device.

15. The system of claim 13, wherein determining the updated status of the condition includes querying an external source for the updated status of the condition.

16. The system of claim 13, wherein the condition is related to solar time, wherein the current status of the condition is a first sunrise/sunset time, and wherein the updated status of the condition is a subsequent sunrise/sunset time.

17. The system of claim 13, wherein the operations further include applying the offset to a value of the updated status to generate an offset updated status, and wherein automatically performing the action based on the updated status of the condition includes automatically performing the action based on the offset updated status.

18. The system of claim 17, wherein the instructions further include updating the offset prior to applying the offset to the updated status.

19. The system of claim 13, wherein the condition is a location-dependent variable capable of having the current status and the updated status, and wherein determining the current status includes dynamically applying the geolocation to the location-dependent variable to obtain the current status.

20. The system of claim 13, wherein the instructions further include saving the current status of the condition and the updated status of the condition.

21. The system of claim 13, wherein dynamically determining the offset includes:
automatically transmitting a request for a pre-calculated offset, wherein the request includes the geolocation; and
receiving the pre-calculated offset, wherein the pre-calculated offset is selected using the geolocation.

22. The system of claim 13, wherein dynamically determining the offset includes:
receiving existing offset information associated with one or more network devices, wherein the one or more network devices share a logical network with the computing device, and wherein the offset information stored by the one or more network devices is used by the one or more network devices to offset an additional value of an additional current status to generate an additional offset status which is used by the one or more network devices to perform an additional action associated with the one or more network devices; and
determining the offset using the existing offset information.

23. The system of claim 13, wherein the operations further comprise:
transmitting a request to confirm the dynamically determined offset;
receiving a response to the request to confirm; and
adjusting the offset based on the response to the request to confirm.

24. The system of claim 13, wherein the operations further comprise obtaining topographical information or altitude information associated with the geolocation, wherein dynamically determining the offset using the rule includes using the topographical information or the altitude information.

25. A non-transitory machine-readable storage medium including instructions configured to cause a data processing apparatus to perform operations including:
obtaining, by a computing device, a geolocation;
determining a current status of a condition using the geolocation of the computing device, wherein the current status is indicative of a value, and wherein the condition is a geolocation-dependent variable;
determining a rule for performing an action by the computing device, wherein the rule includes information for determining an offset;
dynamically determining the offset using the rule;
applying the offset to the value of the current status to generate an offset status;
performing the action based on the offset status, the geolocation, and the rule;
determining an updated status of the condition;
automatically performing the action based on the updated status of the condition, the geolocation, and the rule; and
transmitting a status update associated with the action through a network interface of the computing device, wherein the status update, when received by an access device, is usable to generate an indication of the performance of the action based on the updated status.

26. The storage medium of claim 25, wherein the geolocation is based on a location of the computing device.

27. The storage medium of claim 25, wherein determining the updated status of the condition includes querying an external source for the updated status of the condition.

28. The storage medium of claim 25, wherein the instructions further include saving the current status of the condition and the updated status of the condition.

29. The storage medium of claim 25, wherein the condition is related to solar time, wherein the current status of the condition is a first sunrise/sunset time, and wherein the updated status of the condition is a subsequent sunrise/sunset time.

30. The storage medium of claim 25, wherein the operations further include applying the offset to a value of the updated status to generate an offset updated status, and wherein automatically performing the action based on the updated status of the condition includes automatically performing the action based on the offset updated status.

31. The storage medium of claim 30, wherein the instructions further include updating the offset prior to applying the offset to the updated status.

32. The storage medium of claim 25, wherein the condition is a location-dependent variable capable of having the current status and the updated status, and wherein determining the current status includes dynamically applying the geolocation to the location-dependent variable to obtain the current status.

33. The storage medium of claim 25, wherein dynamically determining the offset includes:
automatically transmitting a request for a pre-calculated offset, wherein the request includes the geolocation; and
receiving the pre-calculated offset, wherein the pre-calculated offset is selected using the geolocation.

34. The storage medium of claim 25, wherein dynamically determining the offset includes:
receiving existing offset information associated with one or more network devices, wherein the one or more network devices share a logical network with the computing device, and wherein the offset information stored by the one or more network devices is used by the one or more network devices to offset an additional value of an additional current status to generate an additional offset status which is used by the one or more network devices to perform an additional action associated with the one or more network devices; and determining the offset using the existing offset information.

35. The storage medium of claim 25, wherein the operations further comprise:

transmitting a request to confirm the dynamically determined offset;

receiving a response to the request to confirm; and adjusting the offset based on the response to the request to confirm.

36. The storage medium of claim 25, wherein the operations further comprise obtaining topographical information or altitude information associated with the geolocation, wherein dynamically determining the offset using the rule includes using the topographical information or the altitude information.

* * * * *